(12) United States Patent
Vermeulen et al.

(10) Patent No.: US 7,720,683 B1
(45) Date of Patent: May 18, 2010

(54) METHOD AND APPARATUS OF SPECIFYING AND PERFORMING SPEECH RECOGNITION OPERATIONS

(75) Inventors: Pieter J. Vermeulen, Portland, OR (US); Robert E. Savoie, Los Altos Hills, CA (US); Stephen Sutton, Portland, OR (US); Forrest S. Mozer, Berkeley, CA (US)

(73) Assignee: Sensory, Inc., Sunnyvale, CA (US)

( * ) Notice: Subject to any disclaimer, the term of this patent is extended or adjusted under 35 U.S.C. 154(b) by 1399 days.

(21) Appl. No.: 10/866,232

(22) Filed: Jun. 10, 2004

Related U.S. Application Data

(60) Provisional application No. 60/478,400, filed on Jun. 13, 2003.

(51) Int. Cl.
*G10L 15/04* (2006.01)
(52) U.S. Cl. .................. 704/254; 704/243; 704/235
(58) Field of Classification Search .......... 704/232, 704/270, 254, 235, 231, 242, 220, 257, 244, 704/243, 255, 272, 270.1; 345/171
See application file for complete search history.

(56) References Cited

U.S. PATENT DOCUMENTS

| | | | |
|---|---|---|---|
| 5,832,441 A | 11/1998 | Aaron et al. | |
| 5,867,816 A * | 2/1999 | Nussbaum | 704/232 |
| 6,078,886 A * | 6/2000 | Dragosh et al. | 704/270 |
| 6,260,014 B1 * | 7/2001 | Bahl et al. | 704/254 |
| 6,263,308 B1 | 7/2001 | Heckerman et al. | |
| 6,307,541 B1 * | 10/2001 | Ho et al. | 345/171 |
| 6,363,342 B2 * | 3/2002 | Shaw et al. | 704/220 |
| 6,728,677 B1 * | 4/2004 | Kannan et al. | 704/270 |
| 6,778,958 B1 * | 8/2004 | Nishimura et al. | 704/235 |
| 6,912,498 B2 * | 6/2005 | Stevens et al. | 704/235 |
| 7,099,828 B2 * | 8/2006 | Kobal et al. | 704/270 |

\* cited by examiner

*Primary Examiner*—Huyen X. Vo
(74) *Attorney, Agent, or Firm*—Fountainhead Law Group P.C.; Chad R. Walsh

(57) ABSTRACT

A speech recognition technique is described that has the dual benefits of not requiring collection of recordings for training while using computational resources that are cost-compatible with consumer electronic products. Methods are described for improving the recognition accuracy of a recognizer by developer interaction with a design tool that iterates the recognition data during development of a recognition set of utterances and that allows controlling and minimizing the computational resources required to implement the recognizer in hardware.

31 Claims, 21 Drawing Sheets

US-English Worldbet Symbols

| Worldbet | IPA | Example | Description |
|---|---|---|---|
| *Vowels* | | | |
| i: | iː | b<u>ee</u>t | high front long |
| I | ɪ | b<u>i</u>t | mid-high mid-front short |
| E | ɛ | b<u>e</u>t | mid-low front short |
| @ | æ | b<u>a</u>t | mid-low front long |
| I_x | ɨ | ros<u>e</u>s | high-central short |
| u_x | ʉ | s<u>ui</u>t | high-central short |
| & | ə | <u>a</u>bout | schwa, mid-central short |
| u | u | b<u>oo</u>t | high back rounded |
| U | ʊ | b<u>oo</u>k | mid-high back rounded short |
| ʌ | ʌ | b<u>u</u>t | mid-low central |
| > | ɔ | c<u>au</u>ght | mid-low mid-back rounded |
| A | ɑ | f<u>a</u>ther | low back |
| 3r | ɝ | b<u>ir</u>d | rhotacized mid-central (stressed) |
| *Diphthongs* | | | |
| ei | ei | f<u>a</u>te | low-high front |
| aI | aɪ | p<u>ie</u> | low-mid front |
| >i | ɔi | b<u>oy</u> | mid back-front |
| iU | iʊ | f<u>ew</u> | high front-back |
| aU | aʊ | h<u>ow</u> | low-high front-back |
| oU | oʊ | b<u>oa</u>t | mid-high back |

Fig. 3B

US-English Worldbet Symbols

*Consonants*

| | | | |
|---|---|---|---|
| ph | pʰ | pie | voiceless bilabial stop |
| th | tʰ | tie | voiceless alveolar stop |
| kh | kʰ | cry | voiceless velar stop |
| b | b | buy | voiced bilabial stop |
| d | d | dye | voiced alveolar stop |
| g | g | guy | voiced velar stop |
| m | m | me | labial nasal |
| n | n | knee | alveolar nasal |
| N | ŋ | sing | velar nasal |
| f | f | fine | voiceless labiodental fricative |
| T | θ | thigh | voiceless dental fricative |
| s | s | sigh | voiceless alveolar sibilant |
| S | ʃ | shy | voiceless alveo-palatal sibilant |
| h | h | high | voiceless glottal fricative |
| v | v | vie | voiced labiodental fricative |
| D | ð | thy | voiced dental fricative |
| z | z | zebra | voiced alveolar sibilant |
| Z | ʒ | azure | voiced alveo-palatal sibilant |
| tS | tʃ | church | voiceless alveo-palatal affricate |
| dZ | dʒ | judge | voiced alveo-palatal affricate |
| l | l | lent | alveolar glide |
| 9r | ɻ | rent | retroflex glide |
| j | j | yes | palatal glide |
| w | w | went | labio-velar glide |

*Other*

| | | |
|---|---|---|
| .pau | _ | Silence |

Fig. 3C

| | | | |
|---|---|---|---|
| Model[ 0] = .pau | Model[ 53] = I-R:n | Model[106] = kc-L:g | Model[159] = ph-R:o |
| Model[ 1] = &-L:a | Model[ 54] = I-R:o | Model[107] = kc-L:c | Model[160] = s-L:b |
| Model[ 2] = &-L:n | Model[ 55] = N-L:o | Model[108] = kc-L:o | Model[161] = s-L:f |
| Model[ 3] = &-L:g | Model[ 56] = N-R:o | Model[109] = kc-R:s | Model[162] = s-L:s |
| Model[ 4] = &-L:s | Model[ 57] = S-L:o | Model[110] = kc-R:o | Model[163] = s-L:o |
| Model[ 5] = &-R:a | Model[ 58] = S-R:f | Model[111] = kh-L:o | Model[164] = s-R:f |
| Model[ 6] = &-R:n | Model[ 59] = T-L:o | Model[112] = kh-R:a | Model[165] = s-R:g |
| Model[ 7] = &-R:g | Model[ 60] = T-R:c | Model[113] = kh-R:f | Model[166] = s-R:o |
| Model[ 8] = &-R:o | Model[ 61] = ^-L:o | Model[114] = kh-R:g | Model[167] = tSc-R:o |
| Model[ 9] = 3r-L:a | Model[ 62] = ^-R:o | Model[115] = kh-R:c | Model[168] = tS-L:o |
| Model[ 10] = 3r-L:s | Model[ 63] = aI-L:n | Model[116] = kh-R:o | Model[169] = tS-R:o |
| Model[ 11] = 3r-R:o | Model[ 64] = aI-L:g | Model[117] = l-L:b | Model[170] = tc-L:s |
| Model[ 12] = 9r-L:a | Model[ 65] = aI-R:n | Model[118] = l-L:f | Model[171] = tc-R:s |
| Model[ 13] = 9r-L:n | Model[ 66] = aI-R:o | Model[119] = l-L:c | Model[172] = tc-R:o |
| Model[ 14] = 9r-L:b | Model[ 67] = b-L:o | Model[120] = l-L:o | Model[173] = th-L:o |
| Model[ 15] = 9r-L:f | Model[ 68] = b-R:f | Model[121] = l-R:a | Model[174] = th-R:f |
| Model[ 16] = 9r-L:s | Model[ 69] = b-R:c | Model[122] = l-R:b | Model[175] = th-R:g |
| Model[ 17] = 9r-L:o | Model[ 70] = b-R:o | Model[123] = l-R:f | Model[176] = th-R:c |
| Model[ 18] = 9r-R:n | Model[ 71] = bc-L:n | Model[124] = l-R:c | Model[177] = th-R:o |
| Model[ 19] = 9r-R:b | Model[ 72] = bc-L:c | Model[125] = l-R:o | Model[178] = u-L:g |
| Model[ 20] = 9r-R:f | Model[ 73] = bc-L:o | Model[126] = l=-L:a | Model[179] = u-L:s |
| Model[ 21] = 9r-R:c | Model[ 74] = bc-R:o | Model[127] = l=-R:o | Model[180] = u-R:n |
| Model[ 22] = 9r-R:o | Model[ 75] = d-L:o | Model[128] = m-L:b | Model[181] = u-R:g |
| Model[ 23] = >-L:a | Model[ 76] = d-R:f | Model[129] = m-L:f | Model[182] = v-L:b |
| Model[ 24] = >-L:s | Model[ 77] = d-R:o | Model[130] = m-L:g | Model[183] = v-L:f |
| Model[ 25] = >-L:o | Model[78] = dZc-R:o | Model[131] = m-L:o | Model[184] = v-L:o |
| Model[ 26] = >-R:a | Model[ 79] = dZ-L:o | Model[132] = m-R:b | Model[185] = v-R:f |
| Model[ 27] = >-R:n | Model[ 80] = dZ-R:o | Model[133] = m-R:f | Model[186] = v-R:c |
| Model[ 28] = >-R:g | Model[ 81] = dc-R:s | Model[134] = m-R:c | Model[187] = v-R:o |
| Model[ 29] = @-L:g | Model[ 82] = ei-L:g | Model[135] = m-R:o | Model[188] = w-L:s |
| Model[ 30] = @-L:s | Model[ 83] = ei-L:o | Model[136] = n-L:b | Model[189] = w-L:o |
| Model[ 31] = @-L:o | Model[ 84] = ei-R:o | Model[137] = n-L:f | Model[190] = w-R:f |
| Model[ 32] = @-R:n | Model[ 85] = f-L:g | Model[138] = n-L:s | Model[191] = w-R:c |
| Model[ 33] = @-R:g | Model[ 86] = f-L:c | Model[139] = n-L:c | Model[192] = z-L:o |
| Model[ 34] = A-L:g | Model[ 87] = f-L:o | Model[140] = n-L:o | Model[193] = z-R:g |
| Model[ 35] = A-L:s | Model[ 88] = f-R:b | Model[141] = n-R:b | Model[194] = z-R:c |
| Model[ 36] = A-R:a | Model[ 89] = f-R:c | Model[142] = n-R:g | Model[195] = .garbage |
| Model[ 37] = A-R:g | Model[ 90] = f-R:o | Model[143] = n-R:s | Model[196] = .any |
| Model[ 38] = A-R:o | Model[ 91] = g-L:o | Model[144] = n-R:c | Model[197] = .nota |
| Model[ 39] = E-L:a | Model[ 92] = g-R:o | Model[145] = n-R:o | Tie[195] = dc-L:n -> bc-L:n |
| Model[ 40] = E-L:g | Model[ 93] = gc-R:o | Model[146] = n=-L:a | Tie[196]=dZc-L:o -> bc-L:o |
| Model[ 41] = E-L:s | Model[ 94] = h-L:o | Model[147] = n=-R:o | Tie[197] = dc-L:o -> bc-L:o |
| Model[ 42] = E-L:o | Model[ 95] = h-R:o | Model[148] = oU-L:a | Tie[198] = gc-L:o -> bc-L:o |
| Model[ 43] = E-R:a | Model[ 96] = i:-L:a | Model[149] = oU-L:n | Tie[199] = tc-L:n -> kc-L:n |
| Model[ 44] = E-R:n | Model[ 97] = i:-L:s | Model[150] = oU-L:g | Tie[200] = pc-L:o -> kc-L:o |
| Model[ 45] = E-R:g | Model[ 98] = i:-R:o | Model[151] = oU-L:s | Tie[201]= tSc-L:o -> kc-L:o |
| Model[ 46] = E-R:o | Model[ 99] = j-L:o | Model[152] = oU-L:o | Tie[202] = tc-L:o -> kc-L:o |
| Model[ 47] = I-L:a | Model[100] = j-R:b | Model[153] = oU-R:a | Tie[203] = tc-L:a -> kc-L:a |
| Model[ 48] = I-L:n | Model[101] = j-R:o | Model[154] = oU-R:n | Tie[204] = pc-L:b -> kc-L:b |
| Model[ 49] = I-L:g | Model[102] = kc-L:a | Model[155] = oU-R:o | Tie[205] = tc-L:b -> kc-L:b |
| Model[ 50] = I-L:s | Model[103] = kc-L:n | Model[156] = pc-R:o | Tie[206] = tc-L:c -> kc-L:c |
| Model[ 51] = I-L:o | Model[104] = kc-L:b | Model[157] = ph-L:o | Tie[207] = tc-L:f -> kc-L:f |
| Model[ 52] = I-R:a | Model[105] = kc-L:f | Model[158] = ph-R:c | Tie[208] = tc-L:g -> kc-L:g |

Fig. 10

```
                              1121      1123          1125
                              ┌─┐    ┌────┐       ┌─┐
state_F state0  = {0x20,  0,  1, 15,  64, 0,  0,   1,8,13, 255}; /* .pau */
state_F state1  = {0x20,  3,  1,  3,   0, 0, 255,  2,      255}; /* j-Lo */
state_F state2  = {0x00,  4,  1,  3,   0, 0, 255,  3,      255}; /* j-Ro */
state_F state3  = {0x00,  1,  1,  3,   0, 0, 255,  4,      255}; /* E-Lg */
state_F state4  = {0x00,  2,  1,  3,   0, 0, 255,  5,      255}; /* E-R:s */
state_F state5  = {0x00,  9,  1,  4,   0, 0, 255,  6,      255}; /* s-L:E */
state_F state6  = {0x40, 10,  1,  4,  64, 0,  1,   7,      255};/* s-R:.pau */
state_F state7  = {0x80,  0,  1, 15,  64, 0,  0,             255};/* .pau */
state_F state8  = {0x20,  5,  1,  2,   0, 0, 255,  9,      255}; /* n-Lo */
state_F state9  = {0x00,  6,  1,  2,   0, 0, 255, 10,      255}; /* n-Rbvd */
state_F state10 = {0x00,  7,  1,  4,   0, 0, 255, 11,      255}; /* oU-Ln */
state_F state11 = {0x40,  8,  1,  4,  64, 0,  2,  12,      255};/* oU-Ruc */
state_F state12 = {0x80,  0,  1, 15,  64, 0,  0,             255};/* .pau */
state_F state13 = {0x30, 13,  1, 15,  64, 0,  3,  14,      255};/*.nota */
state_F state14 = {0x80,  0,  1, 15,  64, 0,  0,             255};/* .pau */
       └───┬───┘          └┬┘           └─┬─┘             └─┬─┘
         1120             1122          1124              1126 gsearch_F gs_comm = {
    0x8,            /* flags */
    15,             /* number of states */
    11,             /* net output size */
    { 38, 35, 35},  /* extra models */
    14,             /* prob size */
    4 ,             /* number of vocabulary words */
    11,             /* garbage model index */
    80,             /* shortPen */
    16,             /* longPen */
    45,             /* beam size */
    2 ,             /* microphone distance */
    110,            /* max record time */
    {
      &state0 , &state1 , &state2 , &state3 , &state4 , &state5 ,
      &state6 , &state7 , &state8 , &state9 , &state10, &state11,
      &state12, &state13, &state14,
    }
};
```

Fig. 11B

| State: | 23 | 24 | 25 | 26 | 27 | 28 | 29 | 30 | 31 | 32 | 33 | 34 | 35 |
|---|---|---|---|---|---|---|---|---|---|---|---|---|---|
| Phone: | 99 | 101 | 104 | 109 | 115 | 5 | 17 | 10 | 121 | 124 | 91 | 93 | 7 |
| Name: | kc-L:o | kh-L:o | kh-R:f | 1-L:f | 1-R:c | &-R:a | >-L:a | 9r-L:b | NA | n-L:o | j-L:o | j-R:o | &-R:o |
| Time | | | | | | | | | | | | | |
| 00 | _16_ | 58 | - | - | - | - | - | - | - | - | - | - | - |
| 01 | _25_ | 105 | 184 | - | - | - | - | - | - | - | - | - | - |
| 02 | _7_ | 94 | 113 | 95 | - | - | - | - | - | - | - | - | - |
| 03 | _9_ | 78 | 127 | 98 | 72 | - | - | - | - | - | - | - | - |
| 04 | 6 | _23_ | 88 | 87 | 79 | 95 | - | - | - | - | - | - | - |
| 05 | 12 | _39_ | 97 | 117 | 83 | 75 | 142 | - | - | - | - | - | - |
| 06 | 111 | 32 | _15_ | 101 | 86 | 108 | 75 | 121 | 99 | - | - | - | - |
| 07 | 115 | 46 | _31_ | 62 | 97 | 105 | 51 | 99 | 102 | 114 | 141 | - | - |
| 08 | 84 | 96 | _27_ | 31 | 55 | 105 | 59 | 67 | 90 | 54 | 82 | - | - |
| 09 | 73 | 100 | 37 | _1_ | 52 | 78 | 34 | 63 | 52 | 53 | 67 | - | - |
| 10 | 56 | 68 | 71 | _4_ | 49 | 52 | 39 | 31 | 31 | 52 | 49 | - | - |
| 11 | 69 | 99 | 70 | _6_ | 26 | 63 | 24 | 23 | 26 | 58 | 52 | 54 | - |
| 12 | 68 | 127 | 52 | 23 | _15_ | 59 | 17 | 43 | 37 | 50 | 39 | 53 | - |
| 13 | 54 | 101 | 77 | 31 | _11_ | 45 | 7 | 10 | 19 | 67 | 52 | 27 | 41 |
| 14 | 40 | - | 102 | 82 | 14 | _26_ | 32 | 18 | 23 | 74 | 34 | 14 | 28 |
| 15 | - | - | 97 | 128 | 46 | _1_ | 68 | 77 | 100 | 84 | 45 | 46 | 47 |
| 16 | - | - | 84 | 103 | 70 | _1_ | 34 | 81 | 107 | 81 | 65 | 70 | 68 |
| 17 | - | - | 54 | 85 | 102 | 4 | _1_ | 73 | 119 | 50 | 60 | 96 | 91 |
| 18 | - | - | - | 89 | 119 | 33 | _0_ | _103_ | 120 | 36 | 52 | 91 | 95 |
| 19 | - | - | - | 64 | 52 | 93 | _1_ | 71 | 71 | 43 | 77 | 48 | 64 |
| 20 | - | - | - | 49 | 40 | 75 | _1_ | 41 | 52 | 55 | 59 | 61 | 49 |

Fig. 12A

| State: | 23 | 24 | 25 | 26 | 27 | 28 | 29 | 30 | 31 | 32 | 33 | 34 | 35 |
|---|---|---|---|---|---|---|---|---|---|---|---|---|---|
| Phone: | 99 | 101 | 104 | 109 | 115 | 5 | 17 | 10 | 121 | 124 | 91 | 93 | 7 |
| Name: | kc-L:o | kh-L:o | kh-R:f | l-L:f | l-R:c | &-R:a | >-L:a | 9r-L:b | NA | n-L:o | j-L:o | j-R:o | &-R:o |

| Time | | | | | | | | | | | | | |
|---|---|---|---|---|---|---|---|---|---|---|---|---|---|
| 21 | - | - | 25 | 54 | *4* | 10 | 29 | 52 | 49 | 30 | 33 | | |
| 22 | - | - | 15 | 69 | 28 | *3* | 8 | 52 | 63 | 15 | 45 | | |
| 23 | - | - | 15 | 50 | 84 | *8* | 17 | 5 | 40 | 15 | 32 | | |
| 24 | - | - | 25 | 43 | 81 | 50 | 16 | *20* | 7 | 27 | 37 | | |
| 25 | - | - | 20 | 51 | 54 | 61 | 18 | 20 | *14* | 23 | 48 | | |
| 26 | - | - | 22 | 49 | 55 | 60 | 39 | 25 | 17 | *7* | 40 | | |
| 27 | - | - | - | 64 | 88 | 78 | 72 | 38 | 22 | *2* | 44 | | |
| 28 | - | - | - | - | 76 | 65 | 72 | 49 | 52 | *16* | 31 | | |
| 29 | - | - | - | - | 79 | 75 | 67 | 55 | 46 | 29 | *23* | | |
| 30 | - | - | - | - | 91 | 52 | 36 | 31 | 27 | 24 | *7* | | |
| 31 | - | - | - | - | 52 | 32 | 31 | 21 | 22 | *7* | | | |
| 32 | - | - | - | - | 67 | 50 | 29 | 14 | 35 | *9* | | | |
| 33 | - | - | - | - | 86 | 50 | 31 | 15 | 43 | *15* | | | |
| 34 | - | - | - | - | 82 | 37 | 34 | 20 | 46 | 19 | | | |
| 35 | - | - | - | - | - | 31 | 26 | 17 | 55 | 19 | | | |
| 36 | - | - | - | - | - | 31 | 16 | 14 | 61 | 21 | | | |
| 37 | - | - | - | - | - | 40 | 18 | 11 | 71 | 35 | | | |

Fig. 12B

| t State Transition | Cum. Score | Prev. Score | Current Value | phone |
|---|---|---|---|---|
| 38, 212 <- 212 | 480 = | 477 | + 3 | phone= 0 ( .pau) avg.= 12 |
| 37, 212 <- 212 | 477 = | 469 | + 8 | phone= 0 ( .pau) avg.= 12 |
| 36, 212 <- 212 | 469 = | 458 | + 11 | phone= 0 ( .pau) avg.= 12 |
| 35, 212 <- 212 | 458 = | 437 | + 21 | phone= 0 ( .pau) avg.= 12 |
| 34, 212 <- 35 | 437 = | 421 | + 16 | phone= 0 ( .pau) avg.= 12 |
| 33, 35 <- 35 | 373 = | 358 | + 15 | phone= .7 ( &-R:o) avg.= 10 |
| 32, 35 <- 35 | 342 = | 333 | + 9 | phone= 7 ( &-R:o) avg.= 10 |
| 31, 35 <- 35 | 317 = | 310 | + 7 | phone= 7 ( &-R:o) avg.= 9 |
| 30, 35 <- 35 | 310 = | 303 | + 7 | phone= 7 ( &-R:o) avg.= 10 |
| 29, 35 <- 34 | 303 = | 280 | + 23 | phone= 7 ( &-R:o) avg.= 10 |
| 28, 34 <- 34 | 294 = | 278 | + 16 | phone= 93 ( j-R:o) avg.= 10 |
| 27, 34 <- 34 | 278 = | 276 | + 2 | phone= 93 ( j-R:o) avg.= 9 |
| 26, 34 <- 33 | 276 = | 269 | + 7 | phone= 93 ( j-R:o) avg.= 10 |
| 25, 33 <- 32 | 283 = | 269 | + 14 | phone= 91 ( j-L:o) avg.= 10 |
| 24, 32 <- 30 | 283 = | 263 | + 20 | phone=124 ( n-L:o) avg.= 11 |
| 23, 30 <- 30 | 263 = | 255 | + 8 | phone= 10 ( 9r-L:b) avg.= 10 |
| 22, 30 <- 29 | 255 = | 252 | + 3 | phone= 21 ( >-R:g) avg.= 11 |
| 21, 29 <- 29 | 252 = | 248 | + 4 | phone= 17 ( >-L:a) avg.= 11 |
| 20, 29 <- 29 | 248 = | 247 | + 1 | phone= 17 ( >-L:a) avg.= 11 |
| 19, 29 <- 29 | 247 = | 246 | + 1 | phone= 17 ( >-L:a) avg.= 12 |
| 18, 29 <- 29 | 246 = | 246 | + 0 | phone= 83 ( f-R:b) avg.= 12 |
| 17, 29 <- 28 | 246 = | 245 | + 1 | phone= 83 ( f-R:b) avg.= 13 |
| 16, 28 <- 28 | 245 = | 244 | + 1 | phone= 82 ( f-L:c) avg.= 14 |
| 15, 28 <- 28 | 244 = | 243 | + 1 | phone= 82 ( f-L:c) avg.= 15 |
| 14, 28 <- 27 | 243 = | 217 | + 26 | phone= 5 ( &-R:a) avg.= 16 |
| 13, 27 <- 27 | 231 = | 220 | + 11 | phone=115 ( l-R:c) avg.= 16 |
| 12, 27 <- 26 | 220 = | 205 | + 15 | phone=115 ( l-R:c) avg.= 16 |
| 11, 26 <- 26 | 205 = | 199 | + 6 | phone=109 ( l-L:f) avg.= 17 |
| 10, 26 <- 26 | 199 = | 195 | + 4 | phone= 31 ( @-R:g) avg.= 18 |
| 9, 26 <- 25 | 195 = | 194 | + 1 | phone= 31 ( @-R:g) avg.= 19 |
| 8, 25 <- 25 | 194 = | 167 | + 27 | phone= 27 ( @-L:s) avg.= 21 |
| 7, 25 <- 25 | 167 = | 136 | + 31 | phone= 27 ( @-L:s) avg.= 20 |
| 6, 25 <- 24 | 136 = | 121 | + 15 | phone=104 ( kh-R:f) avg.= 19 |
| 5, 24 <- 24 | 121 = | 82 | + 39 | phone=101 ( kh-L:o) avg.= 20 |
| 4, 24 <- 23 | 82 = | 59 | + 23 | phone=101 ( kh-L:o) avg.= 16 |
| 3, 23 <- 23 | 73 = | 64 | + 9 | phone= 99 ( kc-L:o) avg.= 18 |
| 2, 23 <- 23 | 48 = | 41 | + 7 | phone= 99 ( kc-L:o) avg.= 16 |
| 1, 23 <- 23 | 41 = | 16 | + 25 | phone= 99 ( kc-L:o) avg.= 20 |
| 0, 23 <- 23 | 16 = | 0 | + 16 | phone= 99 ( kc-L:o) avg.= 16 |

Fig. 13

METHOD AND APPARATUS OF SPECIFYING AND PERFORMING SPEECH RECOGNITION OPERATIONS

RELATED APPLICATIONS

This invention claims the benefit of U.S. Provisional Application No. 60/478,400, filed Jun. 13, 2003.

BACKGROUND OF THE INVENTION

This invention relates to speech recognition, and in particular, to techniques for making a recognizer and performing speech recognition. This invention also relates to methods of improving the accuracy of a recognizer through tuning of recognition parameters.

Speech recognizers are systems that are typically designed to recognize a spoken word or phrase. The words or phrases that the system is able to recognize are commonly referred to as the recognition set. Speech recognition systems are typically implemented in hardware, software or as a combination of hardware and software. In general, there are two types of speech recognizers: speaker-dependent and speaker-independent. Speaker-dependent recognizers operate by requiring the user to record the words or phrases in recognition set before first use. These words or phrases are then analyzed to produce templates representing the acoustic features of the words or phrases in the recognition set. In operation, an unknown word or phrase is spoken by the same user who performed the recording. The acoustic features in the unknown word or phrase are analyzed to form a pattern that is compared to the several templates in order to decide which of the words or phrases in the recognition set was spoken. This comparison is generally done using dynamic time warping, which allows the unknown phrase to be spoken at a different cadence than that of the phrases that produced the templates, without degradation of the recognition capability. While speaker-dependent recognition devices perform well, they are limited in their general applicability by the requirement that the user must train them and that they work well only for the user that trained them. For these reasons, speaker-independent speech recognition devices are highly desired for many applications. Their benefit is that any speaker may use them without that speaker having to say the phrases before first use.

Speaker-independent speech recognizers consume various amounts of computing resources. For example, some recognizers are made from a limited number of computing and memory resources (e.g., execution of the order of a few million instructions per second (MIPS) using a few kilobytes of random access memory (RAM), tens of kilobytes of read-only memory (ROM) and a limited power supply) which makes the recognizer have a low cost. Other recognizers require a large number of arithmetic and addressing units, hundreds or more MIPS, megabytes of RAM and ROM and an unlimited power supply. Recognizers with constrained computational resources are generally adapted for use in a single product and are included as part of that product. Recognizers with unconstrained computational resources usually stand-alone and are accessed remotely via telephone or some other device by multiple users. Because of this difference, speech recognizers used in constrained computing environments must be economical in terms of the resources required for their use while large speech recognizers are less subject to this limitation.

To train a speaker-independent speech recognizer to recognize a specific set of phrases in a constrained computing environment, many recordings of each of the phrases in the recognition set must be obtained. By contrast, the acoustic model in a computationally unconstrained speaker-independent recognizer is trained once for all recognition sets with which it will be used for the given language. This advantage of training an acoustic model, which describes acoustic elements in a language, once for all recognition sets instead of once for each recognition set is offset by the significant resource requirements of such recognizers that make them incompatible with use in many consumer electronic and similar products. An example of a computationally constrained speaker-independent speech recognizer that requires recordings of each vocabulary for training is given in U.S. Pat. No. 5,790,754. Examples of computationally unconstrained speaker-independent recognizers that are trained on acoustic models for each language are given by Bourlard and Morgan (1997), Nuance Corporation (www.nuance.com), OGI Campus, Oregon Health & Science University (OGI/OHSU), Center for Spoken Language Understanding (CSLU), and SpeechWorks (www.speechworks.com).

Major drawbacks of current art speaker-independent speech recognizers are that those inexpensive enough to be used in consumer electronic products require training by collection of recordings of each of the phrases in each recognition set, while those that do not require such recordings require computational resources that render them cost ineffective for use in consumer electronic products.

SUMMARY OF THE INVENTION

Embodiments of the present invention include a method of specifying a speech recognition operation comprising receiving a recognition set from a user, the recognition set comprising one or more utterances, generating a symbolic representation of the sounds of each utterance in the recognition set, generating a plurality of speech recognition parameters for the recognition set, and interactively modifying the symbolic representations, and in accordance therewith, modifying the speech recognition parameters. A computer-readable storage medium may include software for performing different embodiments of the present invention.

Another embodiment of the present invention includes a method (process) of making a speech recognition device. The method comprises receiving a recognition set from a user, the recognition set comprising one or more utterances, generating a symbolic representation of the sounds of each utterance in the recognition set, generating a plurality of speech recognition parameters for the recognition set, interactively modifying the symbolic representations, and in accordance therewith, modifying the speech recognition parameters, and storing the speech recognition parameters in a memory of the speech recognition device. A software design tool may be used to carry out this process, with the result being a speech recognition device capable of efficiently performing speech recognition operations that is made over a substantially reduced cycle time compared to existing techniques of making speech recognition devices.

In one embodiment, the present invention includes a computer-readable storage medium including software. In one embodiment, the software may perform a method, the method comprising receiving a recognition set from a user, the recognition set comprising one or more utterances, generating a symbolic representation of the sounds of each utterance in the recognition set, generating a plurality of speech recognition parameters for the recognition set; and interactively modifying the symbolic representations, and in accordance therewith, modifying the speech recognition parameters.

Embodiments of the present invention may include an inexpensive spoken phrase, small resource demanding, speaker-independent speech recognizer that does not require training with a large number of recordings of each of the phrases in the recognition set and that can be implemented in a cost-effective manner consistent with its use in consumer electronic products. Embodiments of the present invention include a design tool that allows a designer to control and minimize the computational resources required to implement the recognizer in hardware.

In accordance with a one aspect of the invention, the computationally efficient recognizer is trained once to identify all acoustic structures in a given language by using a corpus of phrases in that language to produce an acoustic model that operates without requiring hundreds of recordings of different speakers for each new recognition set.

In accordance with another aspect of the invention, the utterances required in a given recognition set may be entered via a design tool into a text file in a computer and analyzed to determine their acoustic structures.

In accordance with another aspect of the invention, a system is provided for the application developer to interact, through the design tool, with the analysis of the acoustic structures of the input phrases and with the operation of the trained recognizer in order to minimize computational requirements and maximize the recognition accuracy.

In accordance with another aspect of the invention, the acoustic structures of the phrases and the trained recognizer are combined in the design tool to analyze an unknown speech input and to thereby produce an ordered list of the most likely matches to the unknown phrase In accordance with another aspect of the invention, the computational resources required to perform the analysis of an unknown speech input to determine what was spoken are consistent with costs and development cycle time appropriate to consumer electronic products.

In accordance with another aspect of the invention, the electronics required for the speech recognizer can also be used to control the operation of the product that contains the recognizer.

BRIEF DESCRIPTION OF THE DRAWINGS

FIGS. 3B-C illustrate the Worldbet symbols for U.S. English.

FIG. 10 illustrates the outputs of an Acoustic Model neural network along with the subphones corresponding to each output for a specific implementation of the present invention.

FIG. 11B is an example of the information that may be included in a grammar specification data file.

FIGS. 12A-B illustrate an array of likelihoods and a recognition path across a plurality of nodes for recognition of the word "CALIFORNIA."

FIG. 13 illustrates state transitions, cumulative scores, previous scores, current values, subphones, and the average that may be used to arrive at a recognition result for recognizing the word "CALIFORNIA."

DETAILED DESCRIPTION

Described herein are techniques for implementing speech recognition. In the following description, for purposes of explanation, numerous examples and specific details are set forth in order to provide a thorough understanding of the present invention. It will be evident, however, to one skilled in the art that the present invention may be practiced without these examples and specific details. In other instances, certain methods and processes are shown in block diagram form in order to avoid obscuring the present invention.

Embodiments of the present invention include a software design tool to design a speech recognizer. In one embodiment, a user is provided a design tool in which he/she may specify "utterances," which are words or phrases in the recognition set (also referred to herein as a "vocabulary") to be recognized. In one embodiment of the present invention, each utterance is described by a "pronunciation," which is a symbolic representation of the sounds of each utterance. The pronunciation may then be translated (e.g., through a compiler) into a representation that is suitable for matching against the acoustics in a recognizer. In one embodiment, a grammar specification is generated based on the utterances in the recognition set. A grammar specification defines the relationships between the utterances in a recognition set, and may be combined with the pronunciations to specify the recognition task. Furthermore, the pronunciations may be used to specify acoustic models. An acoustic model may include instructions for programming the recognizer to respond to utterances in the recognition set at particular instances of time, and may be trained from a large body of speech representative of a language and its speakers. The design tool may generate an acoustic model and grammar specification data file for use in a recognizer. A grammar specification data file includes information for programming the recognizer to analyze acoustic information against all the words or phrases in the recognition set over a given time interval.

Figure 1:
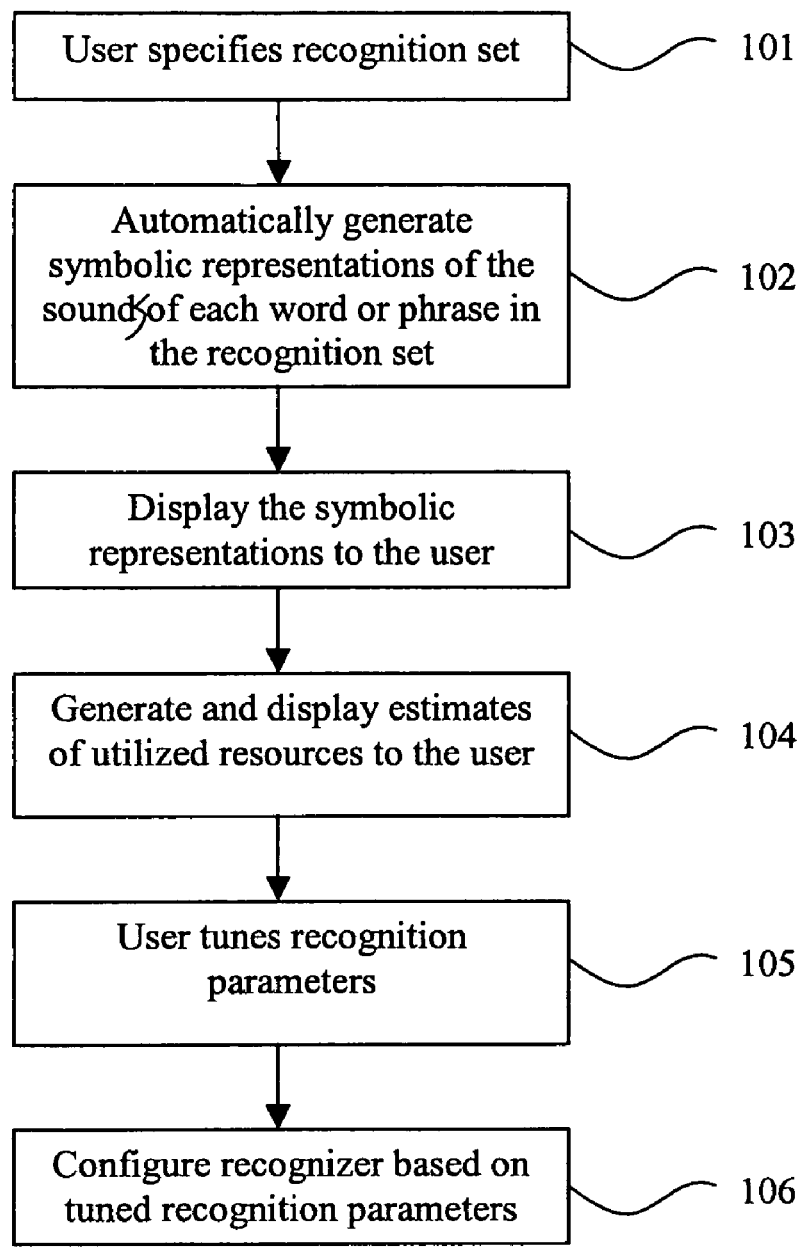
FIG. 1 illustrates a method according to one embodiment of the present invention.

FIG. 1 illustrates a method 100 according to one embodiment of the present invention. In one embodiment, the method 100 may be part of a process for making a speech recognition product. For example, embodiments of the present invention may include a software product used to produce a speech recognizer. According to one embodiment, a user may specify a recognition set, as illustrated at step 101. For example, the recognition set may include one or more utterances (i.e., words or phrases) that the user wants the system to recognize. A symbolic representation of the sounds of each utterance in the recognition set may be automatically generated as illustrated at step 102. In one embodiment, the symbolic representations are displayed to the user as illustrated at step 103. Further, estimates of the resources needed to implement speech recognition may be generated and displayed to a user as illustrated at step 104. Embodiments of the present invention may allow the user to interactively tune the recognition parameters as shown at step 105. For example, the symbolic representations of the sound of each utterance may be modified, and in accordance with the modifications, the recognition parameters are modified to reflect the desired sounds to be recognized. Additionally, the user may interactively tune other recognition parameters to reduce the resources required by the speech recognizer or improve recognition accuracy. A speech recognizer may be configured based on the tuned recognition parameters to recognize utterances specified in the recognition set as illustrated at step 106.

In one embodiment, the user performs the above method on one system (e.g., a computer system) and the recognition parameters are produced and transferred to another system after they have been tuned. For example, a user may perform the method on a computer system that has a relatively large amount of resources compared to the target system. After the recognition parameters are tuned, the user may load the parameters onto the second system. It will be evident to those skilled in the art that some embodiments of the present invention may be used advantageously to develop a speech recognizer on a first system with unconstrained resources and tune the system to work effectively on a second system with constrained resources. However, it will also be evident to those skilled in the art that this is not the only embodiment of the present invention.

Embodiments of the present invention may be used to make speech recognition applications. A speech recognition application may include a sequence of application prompts and user responses, with appropriate actions being taken based on the user response. Embodiments of the present invention include a tool that enables a user to design the recognizer for such an interaction. In one exemplary embodiment, the recognition parameters output by the design tool include both an acoustic model and grammar specification data file. The grammar specification data file may be linked together with the other information and developer supplied application code to form the complete application incorporated into a product.

Different applications may require different speech interface methodologies. In some cases, an application has the initiative and prompts the user for input when appropriate. Prompts are typically spoken, but can also be visual, a combination of visual and spoken or other types of input. This type of interaction is referred to as "prompted" recognition. If there is no response in a certain time window, the system may conclude that it either missed the response or that there was indeed no response, and the system may take appropriate corrective action.

In other cases, the user has the initiative and an application should react when a user speaks to it. We refer to this type of interaction as "continuous listening" recognition. False positives occur when the recognizer reacts to background events and false negatives occur when the recognizer fails to react to an utterance in the recognition set when spoken.

For both "prompted" and "continuous listening" type recognition, once speech is detected, the application has to decide when the user response ends. This is called "end-point detection." Usually, simply waiting for a long period of silence accomplishes this. Another method is to stop recognition as soon as the recognizer obtains some preset confidence level that it has heard a response as defined by its vocabulary and grammar. We refer to the latter method as "early stop end-pointing."

Sometimes it may not be possible to fully define a user response in terms of a vocabulary and grammar, but one would still like to recognize a set of known phrases, surrounded by out-of-vocabulary words. This is known as "word spotting."

Embodiments of the present invention may further include a design tool that enables the designer to build a word-spotting recognizer and a continuous listening recognizer. For word-spotting, recognition may be preceded by a prompt, and the user may present to the recognizer a burst of audio followed by 300 ms of silence, for example. The user response is assumed to contain one of a set of phrases, which is optionally framed by one or more out-of-vocabulary words.

In one embodiment, a "recognition set" may be specified as a list of allowable words or phrases (i.e., utterances) that the user is expected to say. A user can enter words or phrases to be recognized during normal recognition mode and optional trigger words or phrases to be recognized. If trigger words are used, the application may listen continuously until the specified trigger phrase is successfully recognized before prompting the user for the command phase. The trigger word and command vocabularies may be represented as separate grammar specifications and may be organized as a single design tool project. The system then generates an estimate of the target system resources that will be used to perform the recognition. In another embodiment, the system may allow the user to test the recognition accuracy interactively on a system with unconstrained resources, such as a local PC, server or workstation. Once the system achieves the desired accuracy, the user can then complete the recognizer by loading the recognition parameters into the target system. The target system may be a remote stand-alone speech recognition system, for example.

Figure 2:
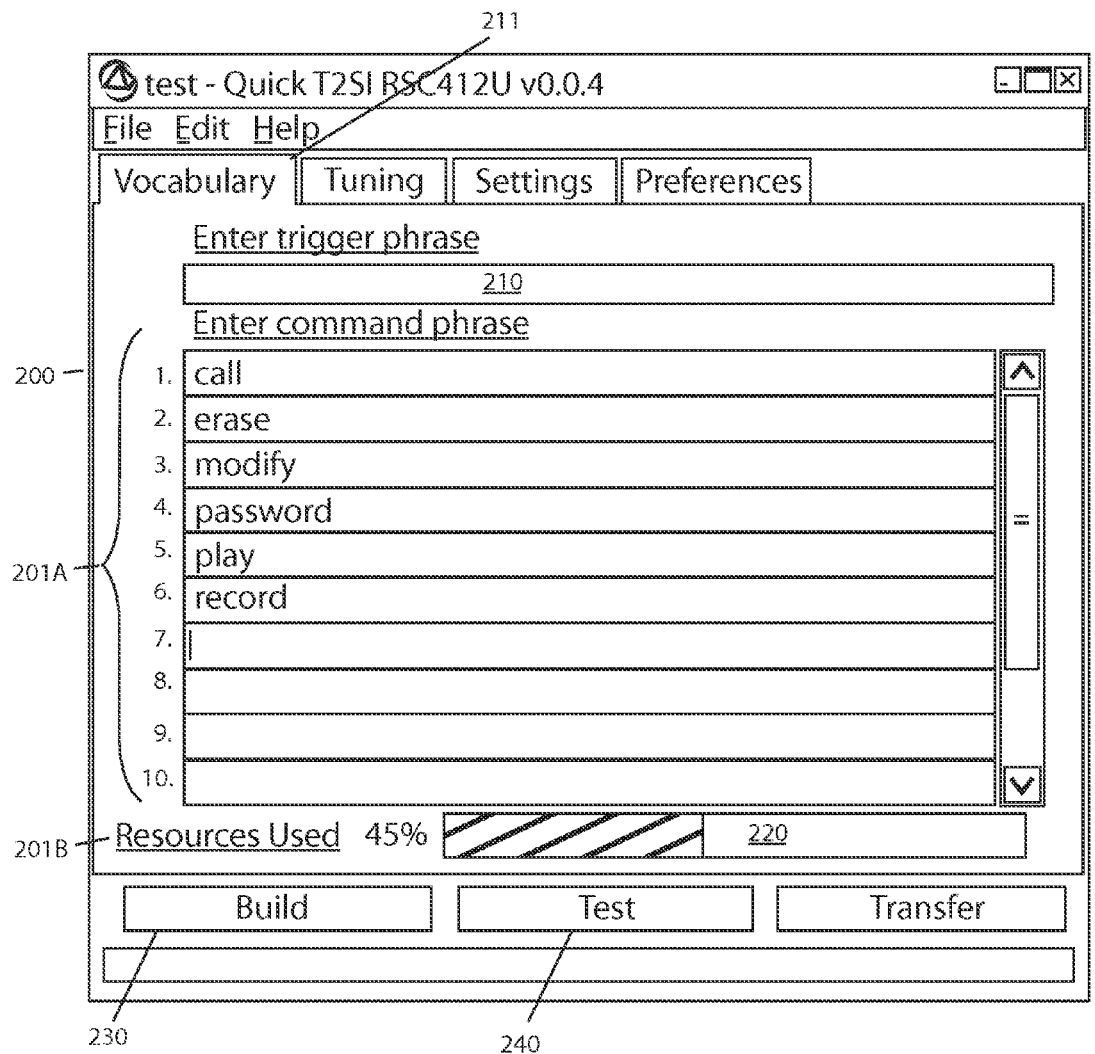
FIG. 2 illustrates a graphical user interface that may be used to define utterances in a recognition set according to one embodiment of the invention.

FIG. 2 illustrates a graphical user interface 200 including a "Vocabulary" tab 211 that may be used to define utterances in a recognition set according to one embodiment of the invention. A trigger phrase, also commonly known as a "gateway" or "wake-up" phrase, allows the user to verbally address the application before issuing a speech command. The application may initially be in an effective sleep state, continuously listening for the trigger phrase. Only when the trigger phrase is successfully recognized will the application proceed, typically by preparing to recognize the command phrases. A user may specify a trigger phrase by typing in the word or phrase to be spoken in field 210.

Command phrases may be specified in section 201A as a list of words or phrases to be recognized. Embodiments of the present invention may use the command phrases in prompted recognition mode (as opposed to continuous listening) during operation. When a user speaks, the recognizer will return the command phrase that best matches the incoming speech. If no good match is found, the recognizer may return a "none-of-the-above" signal ("NOTA") or equivalent. If no speech is detected after a predetermined amount of time, the recognizer may time-out. To specify command phrases, a user may enter one phrase per line in the numbered boxes 1-10. The <Return> key may be used to enable the next entry, and the arrow keys may be used to navigate between lines, for example. In one embodiment, the current trigger and command phrases can be cleared from an "Edit→Clear Vocabulary" menu entry.

Embodiments of the present invention may include generating an estimate of utilized resources. In constrained systems, the limited hardware can only accommodate a certain size vocabulary and different words may require different resources. To aid a user in sizing the application, an estimate of the required resources needed to implement the current command phrases is generated, and such information may be provided to a user. For example, FIG. 2 illustrates that a "Resources Used" section 201B of the display is provided on the bottom of the "Vocabulary" tab 211. The display includes an estimated percentage of resources used by the current recognition set (e.g., 45%) and a resource bar 220. For example, in one embodiment, the size of the memory required is calculated from the given input data. The calculated memory size is then compared to the memory available on a target system. If the system memory were twice as big as the calculated memory size, then only 50% of the resources would be required. Additionally, separate estimates may be made for both RAM and ROM resources in the target system. The ROM estimate may include the total ROM size required for both the acoustic model and the grammar specification data file. Furthermore, the resources may be available to each vocabulary. For example, an application can have multiple vocabularies, and each may use all the available resources by itself. Thus, different recognition sets may be used at different times and loaded from memory when used.

In one embodiment a user can test a vocabulary on a first system before it is loaded into another system for its intended operation. For example, once a vocabulary has been specified (e.g., trigger phrase and/or command phrases) it can be tested on a personal computer ("PC"). The testing procedure can be used repeatedly to verify that each utterance is recognized reliably. With regard to FIG. 2, a user may press the <Test> button 240 at the bottom of interface 200. The <Test> may now become a <Stop> button. The phrase or phrases to be spoken can be highlighted (e.g., in yellow). If a trigger phrase was specified, the recognizer must first successfully recognize the trigger phrase before it moves on to the command phrases. A user may then enter test signals (i.e., spoken utterances). A poor match of the trigger phrase will cause it to remain in the trigger phrase state. When a good trigger match is found, it may indicate a match (e.g., play a beep) and then highlight the command phrases in yellow, indicating it's expecting a command phrase. The testing ends if a user enters a command phrase that is recognized. Alternatively, testing may end if no speech was detected for a predetermined period of time (i.e., it times out). At any time during vocabulary testing, the user can press the <Stop> button to halt the test. If a command phrase is successfully recognized it may be highlighted in green. If no good match is found or if it times out, none may be highlighted. A match or timeout may conclude the test, and the test may be repeated as many times as needed for the same or different configuration.

As part of the process of designing the recognizer, each utterance in the recognition set may be expanded to a "pronunciation" (i.e., a symbolic representation of the sounds in an utterance). For example, a "pronunciation" may be generated automatically by replacing an utterance in the recognition set by a sequence of "phonemes" or "phones" that describes the pronunciation of that utterance. Phonemes are symbolic representations of sound, typically alphabets, that include all distinct sounds in a language that can be distinguished by a human. Phones include all distinct sounds in a language whether or not detectable by a human. The terms "phoneme" and "phone" may be used interchangeably in the description of the examples below. Thus, a "pronunciation" may include phones (i.e., a phone set or phone sequence) that describe an utterance in the recognition set. Furthermore, additional phones may be generated that describe other pronunciations for the same utterance. The complete phone specification may include all phones that describe all the pronunciations of all the utterances in the recognition set. This is also referred to as a "pronunciation specification."

In one embodiment, the present invention allows a person skilled in the art of phonemic recognition to specify an optimal set of models for a language by fine tuning phones for each utterance in the recognition set. The phones may be crafted to be specific enough to allow for recognition, but limited in number so that they can fit on the target system. By giving up accuracy, the number of models can be limited to fit the available computational resources. Embodiments of the present invention include a design tool that provides a user (e.g., a developer) with a set of acoustic models from which to select those that fit a given hardware architecture while optimizing the recognition accuracy of the resulting product, as described below. In one embodiment, the design tool uses the phones to automatically specify the acoustic model that is used during recognition.

While some phones are by their nature not dependent on context, such as silence, background and catch-all "phones," other phones may sound different depending on preceding or following sounds. Thus, in some embodiments of the present invention the phones in each pronunciation may be further broken down into subphones (it should be noted that "subphones" are sometimes referred to as "phones" but in this description the term "subphones" will be used). Each subphone can have significantly different acoustic renditions based on the subphones that precede and follow it (i.e., the subphones are context dependent). To accurately model these differences, each subphone is described by a context dependent acoustic model that includes information about preceding and following subphones. For example, in one embodiment each phone is divided into two halves: the initial half, which may be referred to as left half (denoted herein, "phone-L"), and the final half, which may be referred to as the right half (denoted herein, "phone-R"). Based on linguistic knowledge and statistical evidence, different left and right contexts may be modeled according to design choice. For example, the vowel initial part of /E/ following any voiced fricative can be modeled and denoted "E-Lvf," or it can be modeled more finely and have a model for /E/ following /v/ named "E-L:v, "/E/ following /z/ named "E-L:z," and so on for all voiced fricatives separately. Depending on these design decisions, the size of the acoustic model will change. Multiple models per language may be included and made available to a user of a design tool. In one embodiment, two models are provided: a small one that will fit in the target system in its totality without pruning and another that will only fit when pruned to the vocabulary.

In one embodiment, utterances in a recognition set are used to generate a grammar specification. A grammar specification defines the relationships between the utterances in a recognition set and may include the sequences of subphones, including alternate sequences, if any, that define the utterances in the recognition set. When you have words making up phrases, you may specify how the words follow each other to make up a phrase and how phrases relate to each other to fully specify the task. An example grammar specification may be a sequence that allows an optional silence followed by the word 'I' optionally followed by the word 'am', followed by one of the set of words 'hungry, tired, angry', and then followed by silence.

One issue that arises when creating a recognizer is varying pronunciations. Language, region and age specific phonological modifications may change pronunciations. Accurate recognition requires that these modifications be considered when developing the recognizer. Certain "proper" phone sequences may get optionally replaced by a different sequence in a very predictable fashion by different groups. For example, the /t/ in the word "water" is often replaced by a flap that sounds very different from the /t/ in the word "tan" (e.g., a flap is /th/ as in "Tom,"/d/ as in "Don," or /n/ as in "No," when these phones occur between a stressed vowel and an unstressed vowel as in "Latter," "Ladder," or "Tanner"). Or the /k/ in the word "book" is sometimes not pronounced, especially if it is followed by another word that starts with a /p/, /t/, /k/, /b/, /d/ and /g/. In the first case (the flap), one can simply replace the /t/ with the flap, but in the latter, the recognition accuracy will be better if both renditions are allowed. These predictable modifications are well known to people skilled in the art of phonology.

In one embodiment, the design tool replaces each utterance in the recognition set by multiple pronunciations including different phones to describe different renditions of each utterance. These include multiple common pronunciations as well as the phonological modifications. For example, each word (which might be used in several places in the grammar) typically has an associated pronunciation as specified by a phone sequence. Each word may also have multiple pronunciations associated with it that specify alternate sounds that may be observed when the word is spoken.

In one embodiment, the phones for each utterance may be further replaced by contextual subphones, and the subphones may be translated into one or more acoustic models. By incorporating the information in the pronunciation specification, the grammar specification may be modified to include phone sequences, and further modified to include subphone sequences that can be used to specify acoustic models. Thus, a "compiled grammar" may specify all the allowable sequences of acoustic models that are allowed in the recognizer. An example of this technique is described in more detail below.

Compiling the recognition set and pronunciation specification to an acoustic model based representation may be done by an offline process called the "search compiler." In one embodiment, the inputs to a search compiler are the grammar specification, pronunciation specification and a full acoustic model. The outputs of the compiler are a grammar specification data file and an acoustic model that has been tailored to recognize utterances in the recognition set. The grammar specification data file and acoustic model may be loaded into local PC or workstation or onto a target system (e.g., a stand alone system) for performing the recognition process. Various optimizations allow minimizing the size of this description (i.e., the number of acoustic model instances and the relationships or paths between them). For instance, phrases that share utterances can share relationship paths, which are the possible ways to traverse the nodes in the grammar. Each utterance in the recognition set may share many of the same models that make up its various possible pronunciations. Additionally, phonological rules may be applied so that cross word phonology is observed. Words may be compiled and optimized first, and after phonological rules are applied, all paths may be recombined to ensure a minimal node representation of each word. Grammars may be optimized at the word level so that words are shared on the left, if possible. Then, words may be replaced by their phone representations and the grammar reanalyzed to share from the left. Word paths should end uniquely for each word to allow for decoding of what was said. Then, each phone may be replaced by two subphones in context and the grammar reanalyzed to share from the left.

Although it is not necessary to compile the recognition set and pronunciation specification into a description based on acoustic models, it does allow for a significantly simplified run-time recognizer. Alternatively, the run-time recognizer can analyze the utterances in the recognition set, look up possible pronunciations and finally look up the acoustic model. However, compiling allows saving the final description of allowable acoustic paths in an optimized fashion. This allows the run-time engine to sequentially traverse memory, allowing for optimized pipelining in implementation, as well as a simplified memory path. It also eliminates the code and cycles required to analyze the recognition set.

According to one embodiment, a feature of the invention is the method by which a designer not skilled in the art of recognition, language, or phonology, is able to use the design tool to specify a speech recognition task with sufficient precision to produce accurate recognition within a given set of resources. The resources used by the recognition may also be estimated by the design tool. First, the designer enters a desired list of utterances (e.g., as text) to be used as the recognition set of interest. The design tool may then specify default pronunciations automatically. For example, the designer may be presented with a list of possible pronunciations of each utterance generated from a statistical model of pronunciation for that language. Next, the designer may select, de-select or re-specify the pronunciations of each utterance in the recognition set, again using the design tool. Using a speech synthesizer (e.g., a standard recorded diphone unit speech synthesizer), a pronunciation representing an utterance in the recognition set may be played, and the designer can listen to each synthesized pronunciation on demand in order to select the ones that should be allowed. Thus, generating synthesized audio corresponding to symbolic representations of the sounds of an utterance allows a user to interactively modify the symbolic representations to improve recognizer performance. In addition, a phonetic keyboard may be provided for the designer to use in editing pronunciations. Each key can be played back to enable a person not skilled in the art of phonetics to accurately specify any arbitrary pronunciation. Phonological knowledge is then applied to the final set of pronunciations before programming the target system. During development of the recognition set, the designer may also pass recorded words or phrases through the design tool to determine the overall recognition accuracy or the pronunciation of a phrase that is preferred among the several pronunciations that are possible. The user can provide a list of files to the design tool for batch testing of pronunciations. The results of this testing may include:

1. A confusion matrix (including out-of-vocabulary) summarizing the per-phrase accuracy and highlighting the problem phrases.

2. A per-phrase analysis of error utterances, showing which phones in the best matching pronunciation were problematic.

3. A detailed analysis of error utterances of a specific phrase. This detailed analysis may include an analysis of the phone alignment of the wrong result, the best alignment possible for the current pronunciation, and the time-aligned acoustic model values.

As the designer proceeds through the selection of these alternate pronunciations, the design tool provides him/her with an estimate of the computational resources required to implement the selected recognition attributes in hardware. In this way the designer is able to maximize the recognition accuracy while using no more than the resources allowed by the recognition hardware.

Another feature of the present invention is a "Acoustic Model combiner" or "net combiner," which allows the system to have one acoustic model (e.g., a neural net) for multiple vocabularies, rather than having a different pruned acoustic model for each vocabulary in a product. The "net combiner" is a feature of the design tool that allows a user to combine multiple recognition vocabularies into a single project so that all vocabularies use the same pruned acoustic model net. By examining the acoustic outputs required for each separate vocabulary, a single net can be constructed that incorporates all the needed outputs. This minimizes ROM space for a multi-vocabulary project. For example, many tasks only require a limited set of all the acoustic models of that language. Once the task has been specified, the full acoustic model may be pruned to contain only those models that are required. This may be done by removing from an output layer of a neural network those outputs and the weights connecting them to previous layers (e.g., a hidden layer) that are not required. This leads to a significant saving in ROM space and computations. This is an activity that may be monitored by the developer in a design tool, in order to minimize the amount of pruning required for a given recognition set while guaranteeing that it is still compatible with the available hardware.

Figure 3A:
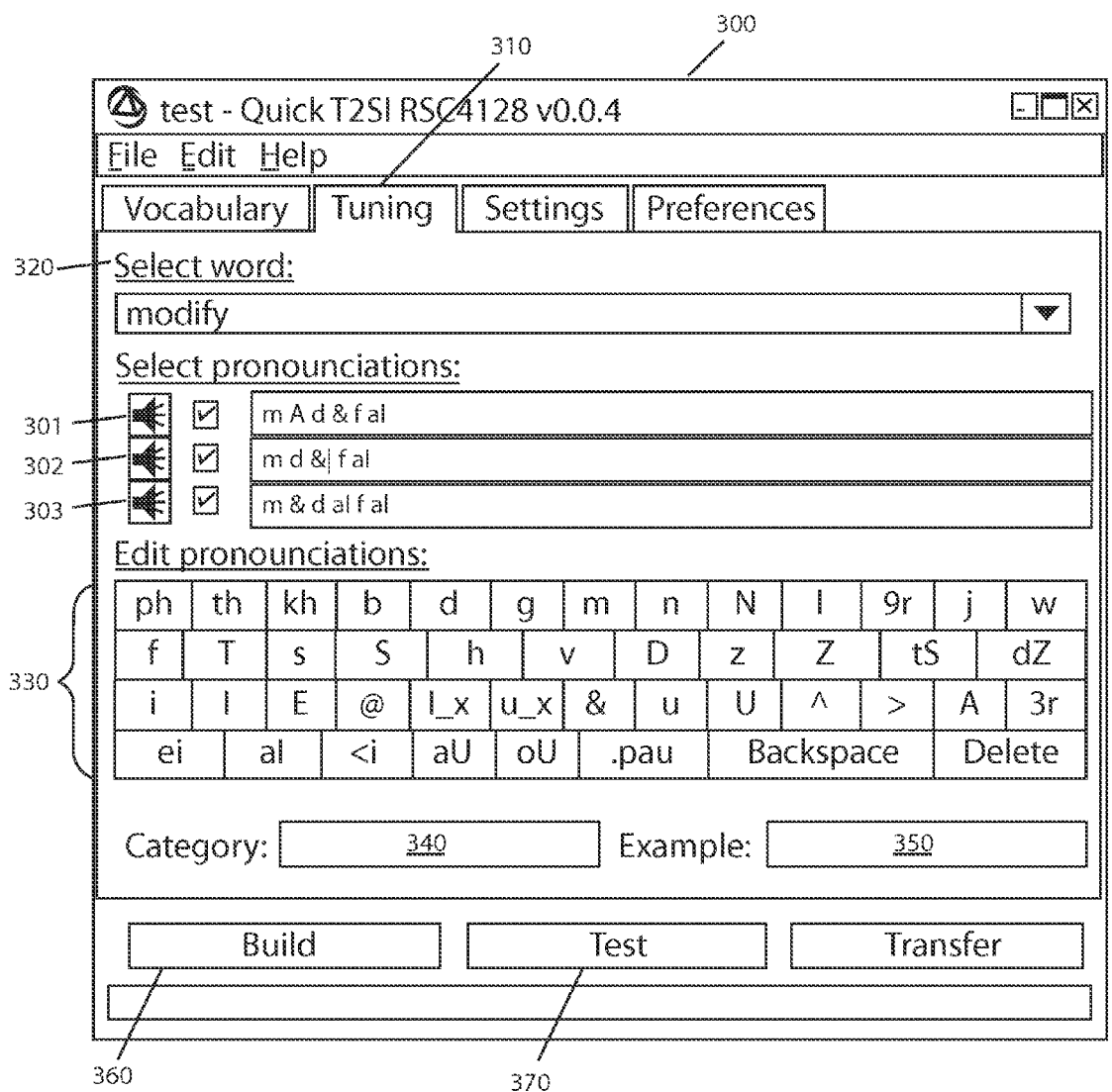
FIG. 3A illustrates one embodiment of the present invention where a user may tune automatically generated symbolic representations of the sound of each utterance in a recognition set.

As mentioned above, difficulties recognizing particular utterances may be due to a word having multiple renditions. To address this issue, embodiments of the present invention include interactively tuning recognition parameters to improve the performance of the recognizer. For example, FIG. 3A illustrates one embodiment of the present invention where a user may tune (e.g., modify) automatically generated symbolic representations of the sound of each utterance in a recognition set. FIG. 3A may be displayed by clicking on the "Tuning" tab 310 of a software graphical user interface ("GUI") 300. In this particular example, a plurality of phones are automatically generated for each utterance, and a user may fine-tune the phones.

GUI 300 includes a "Select word" pull-down menu 320, which may list all the utterances in the recognition set, which are the combined trigger and command phrases in this example. These utterances may share recognition parameters. Thus, the same pronunciation may be used everywhere. For example, if the recognition set included the two phrases "I love you" and "I love bananas," then the pronunciations for the words "I" and "love" may be used everywhere these words are used (i.e., they are shared in the recognizer) to decrease the amount of memory required. First, a user may select the utterance to tune from the pull-down menu. In this example, the utterance is the word "modify." The GUI may include three automatically generated alternate pronunciations for the word, as shown in FIG. 3A. A user may use one, two or all three pronunciations for recognition. More pronunciations increase the probability of recognition because the system can recognize different ways of saying the same word.

Embodiments of the present invention allow a user to interactively select and tune the pronunciations. In one embodiment, a user can listen to each alternate pronunciation by clicking on speaker icons 301-303 as shown in the leftmost part of FIG. 3A. Embodiments may use a speech synthesizer to generate the sequence of phones that are specified. A user can change the pronunciations as follows until each alternate sounds correct. First, a user may enable or disable an alternate pronunciation by selecting or de-selecting it with a click on the corresponding check box on the right of each pronunciation. Next, a user may speak and have the tool recognize using the selected alternate pronunciations. The tool will tell the user which one most closely matched the pronunciation. Those that are frequently selected by the recognizer may be enabled. A user may test a pronunciation by clicking on the <Test> button 370. A beep may be played on the speakers to indicate that the user should start speaking. Only the selected pronunciations are active during this test. At this point the button changes function (i.e., to a <Stop> button), and the testing process can be interrupted by clicking on the <Stop> button. After end-point detection, the tool indicates the closest match (e.g., by highlighting the closest match in yellow).

Embodiments of the present invention may further include interactively selecting symbolic representations of sounds to tune the performance of a recognizer. In one embodiment, phones are displayed on a keyboard 330 and a user edits the automatically generated phones interactively to obtain better recognizer performance. For example, a pronunciation can be edited with keyboard 330. When a cursor moves over a phone on the keyboard, a key may be highlighted and an example word that contains that phone may be shown on a line below the keyboard (e.g., in text box 350 labeled "Example"). For example, if the cursor was above the "schwa"/&/ phone, which may be highlighted using a color (e.g., red), the word "above" may be shown in "Example" box 350, with the initial "a" highlighted to show that an example of a "schwa" is the initial sound in the word "above." Additionally, a user may listen to the sound corresponding to the phone. For example, by right-clicking the mouse button while the curser is on the key, the synthesizer may speak the phone three times.

Furthermore, the category of the phone may also be displayed. In FIG. 3A, "Category" text box 340 displays the category of the phone (e.g., the "schwa"/&/ is a vowel). Categories include "plosives," "nasals," "fricatives," "approximants," "vowels," "trills," "flaps," "affricates," and "diphthongs." Phones from the same category may be grouped together on the same line of the keyboard. For example, "plosives" are on the top left, "nasals" on the top right, and all the vowels are on the second line from the bottom. This makes it easy for a user to search for similar phones that might be good alternates to the phones that were automatically generated for each word or phrase in the recognition set.

FIG. 3A illustrates an example implementation of the present invention using the "Worldbet" phonetic alphabet. FIGS. 3B and 3C illustrate the Worldbet symbols for U.S. English. However, it is to be understood that this is just one example of symbolic representations of sounds that could be used. Other embodiments may use other phonetic alphabets, variants of alphabets or other representations. As set forth in more detail below, one embodiment of the present invention allows a user to select between different phonetic alphabets and variants of phonetic alphabets.

Figure 3D:
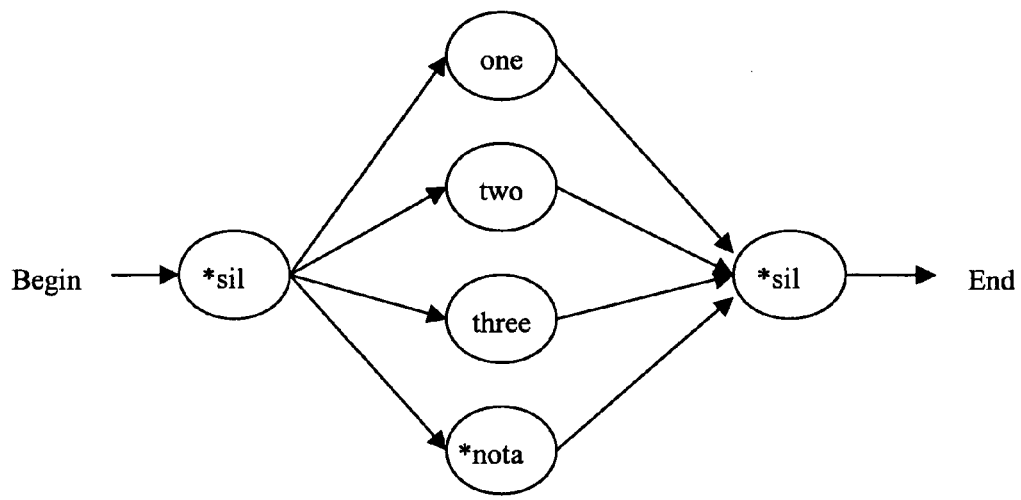
FIG. 3D is an example of a grammar specification according one embodiment of the present invention.

FIG. 3D is an example of a grammar specification according one embodiment of the present invention. In this example the utterances are "one," "two" and "three." The grammar specification defines the relationship between the words in the recognition set. These relationships may be represented in computer using a variety of well-known programming techniques. A grammar specification may also include silence ("*sil") and "none of the above" ("*nota"). In this example, a recognizer would expect to receive an optional silence at the beginning of a recognition operation followed by one of the words in the recognition set or "*nota," followed again by silence. Of course, this is only an example. Any words or phrases in a recognition set may be defined by grammar specification as shown in FIG. 3D.

Figure 3E:
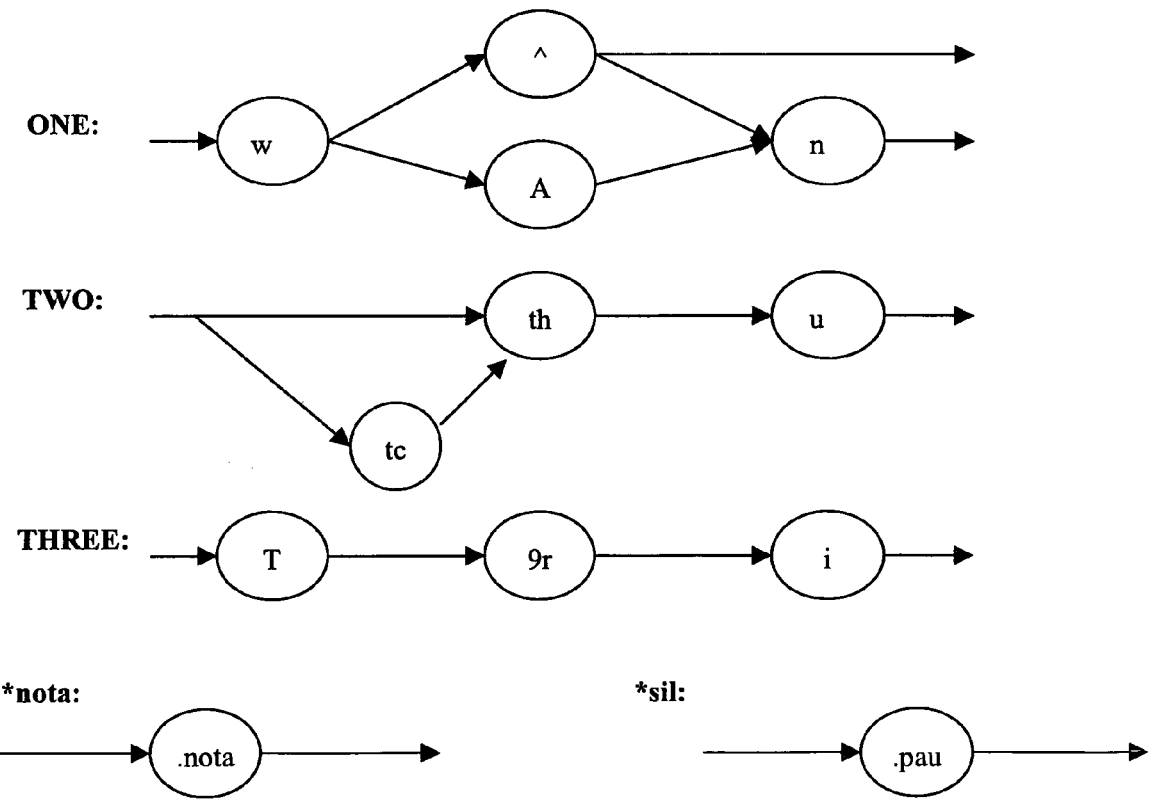
FIG. 3E is an example of the pronunciations of the utterances in FIG. 3D.

FIG. 3E is an example of the pronunciations of the utterances in FIG. 3D. In this example the words in the grammar specification have the following pronunciations:

| ONE: | /w A n/, /w ˆ n/, and /w ˆ / |
| TWO: | /tc th u/ and /th u/ |
| THREE: | /T ar i:/ |
| *SIL: | /.pau/ (silence word) |
| *NOTA: | /.nota/ (out-of-vocabulary or "catch-all" word) |

Figure 3F:
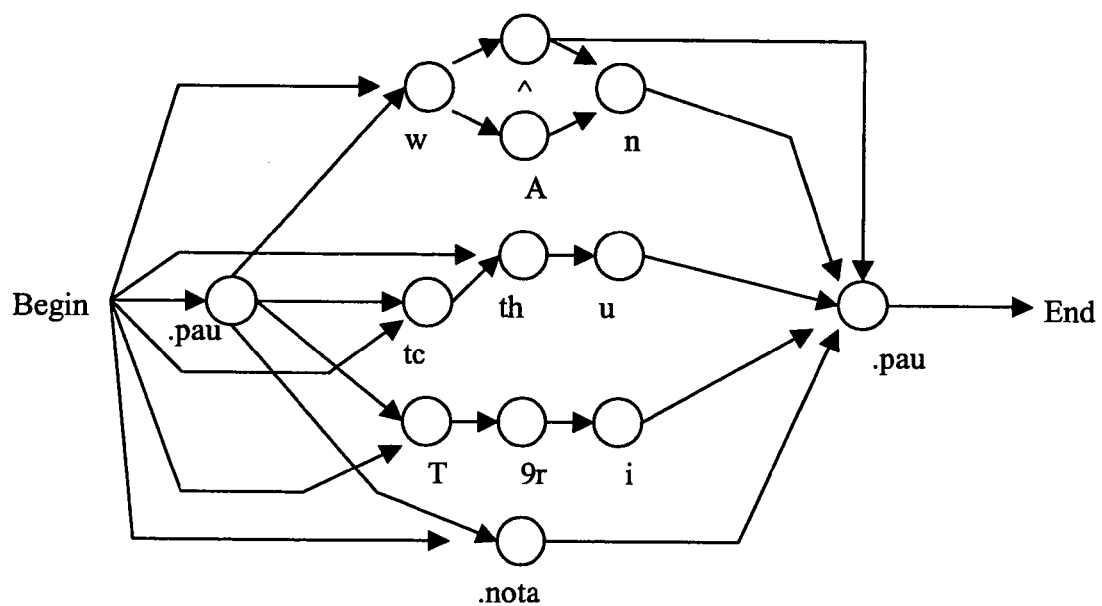
FIG. 3F is an example of a grammar specification including word and phone relationships.

The pronunciations above may be represented as shown by the relationships in FIG. 3E. In cases where the pronunciations are complex, simplified pronunciations may be presented to a user to allow for easier interactive tuning. For example, while the pronunciation for the word "two" is /tc th u/ and /th u,/ a simplified pronunciation of /th u/ may be presented to a user for tuning. The relationships represented by FIG. 3D may be further refined by replacing each word in the grammar specification with the pronunciations in FIG. 3E. FIG. 3F is an example of a grammar specification including both word and phone relationships.

As mentioned above, embodiments of the present invention may further break phones down into subphones. Additionally, each subphone may be associated with an acoustic model that is used during a recognition operation. From the relationships illustrated in FIG. 3F contextual subphones may be determined as shown in Table 1 below:

TABLE 1

| Left Context | Subphone | Right Context | Subphone |
|---|---|---|---|
| /w/ after /.pau/ | w-Lsil | /w/ before /ˆ/ | w-Rbv |
| /w/ after <nothing> | w-Lsil | /w/ before /A/ | w-Rbv |
| /th/ after /.pau/ | th-Lsil | /ˆ/ before /.pau/ | ˆ-Rsil |
| /th/ after <nothing> | th-Lsil | /ˆ/ before /n/ | ˆ-Rn |
| /th/ after /tc/ | th-Ltc | /A/ before /n/ | A-Rn |
| /tc/ after /.pau/ | tc-Lsil | /n/ before /.pau/ | n-Rsil |
| /tc/ after <nothing> | tc-Lsil | /tc/ before /th/ | tc-Rth |
| /T/ after /.pau/ | T-Lsil | /th/ before /u/ | th-Rbv |
| /T/ after <nothing> | T-Lsil | /u/ before /.pau/ | u-Rsil |
| /ˆ/ after /w/ | ˆ-Lg | /T/ before /9r/ | T-Rg |
| /A/ after /w/ | A-Lg | /9r/ before /i/ | Ar-Rfv |
| /n/ after /ˆ/ | n-Lbv | /i/ before /.pau/ | i-Rsil |
| /n/ after /A/ | n-Lbv | | |
| /u/ after /th/ | u-Lus | | |
| /9r/ after /T/ | 9r-Luf | | |
| /i/ after /ar/ | i-Lg | | |

Figure 3G:
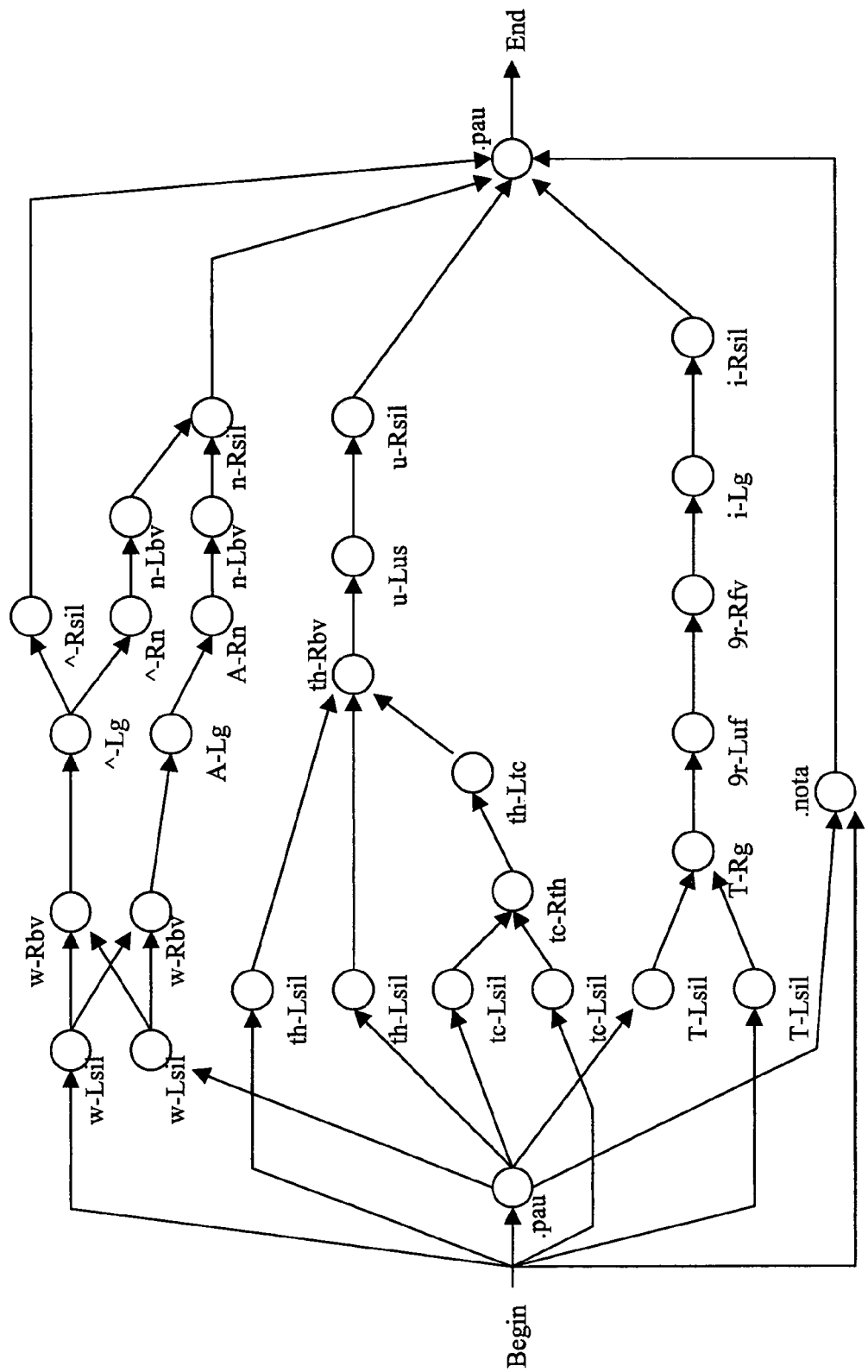
FIG. 3G is an example of a grammar specification including complete subphone relationships.

In this example, /.pau/ and /.nota/ are context independent phones that may be modeled as a sign unit. FIG. 3G is an example of a grammar specification including complete subphone relationships.

Figure 3H:
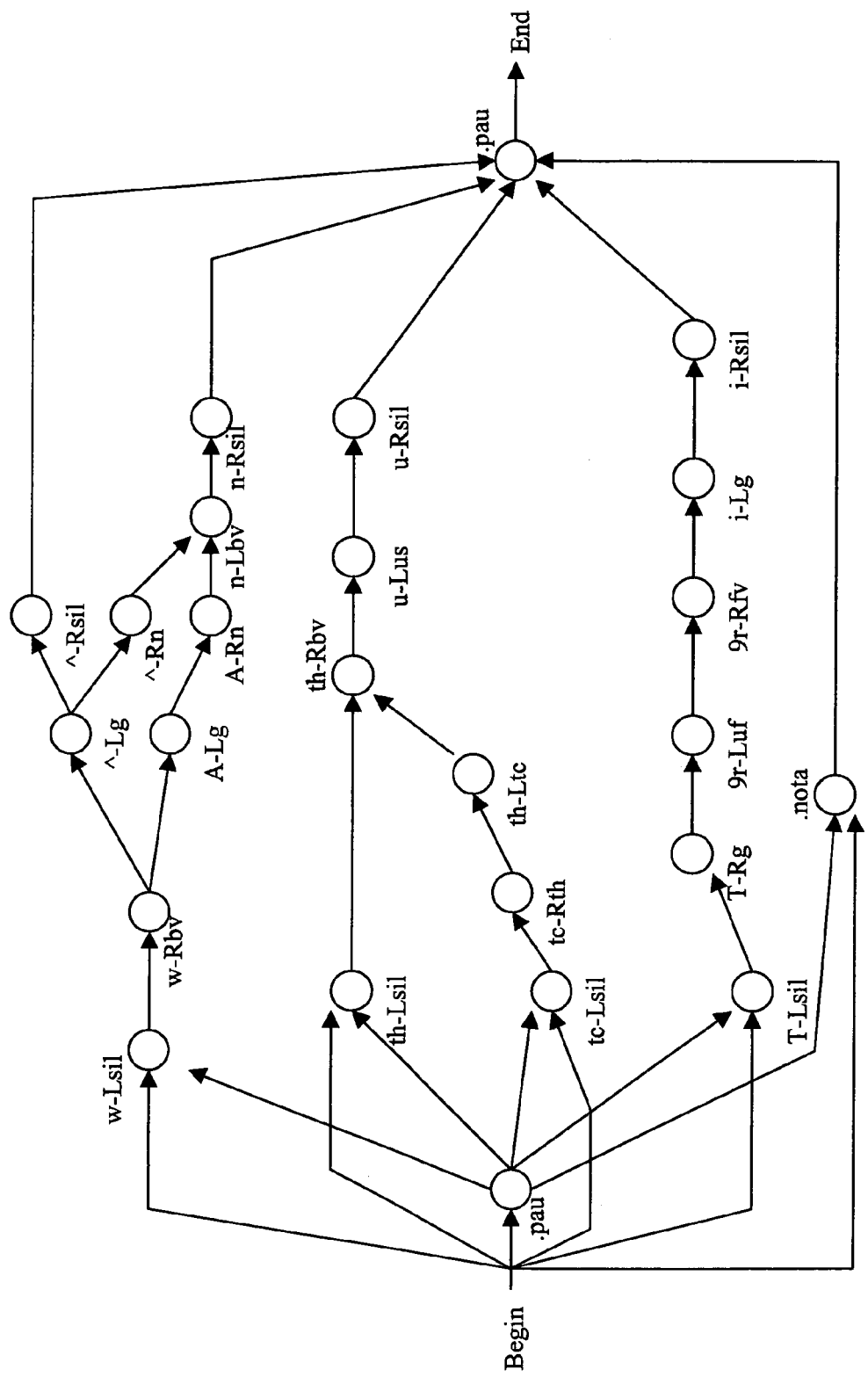
FIG. 3H is an example of optimized subphone relationships.

In one embodiment, the present invention includes a method of optimizing the relationships between the words, phones and subphones. For example, common nodes may be combined at the word level, phone level and/or subphone level. FIG. 3H is an example of the grammar specification resulting after the subphone relationships illustrated in FIG. 3G have been optimized. Additionally, acoustic models may model both sound and duration. In this example, such acoustic models may be used to model both the sound and duration of each subphone in FIG. 3H.

Figure 4:
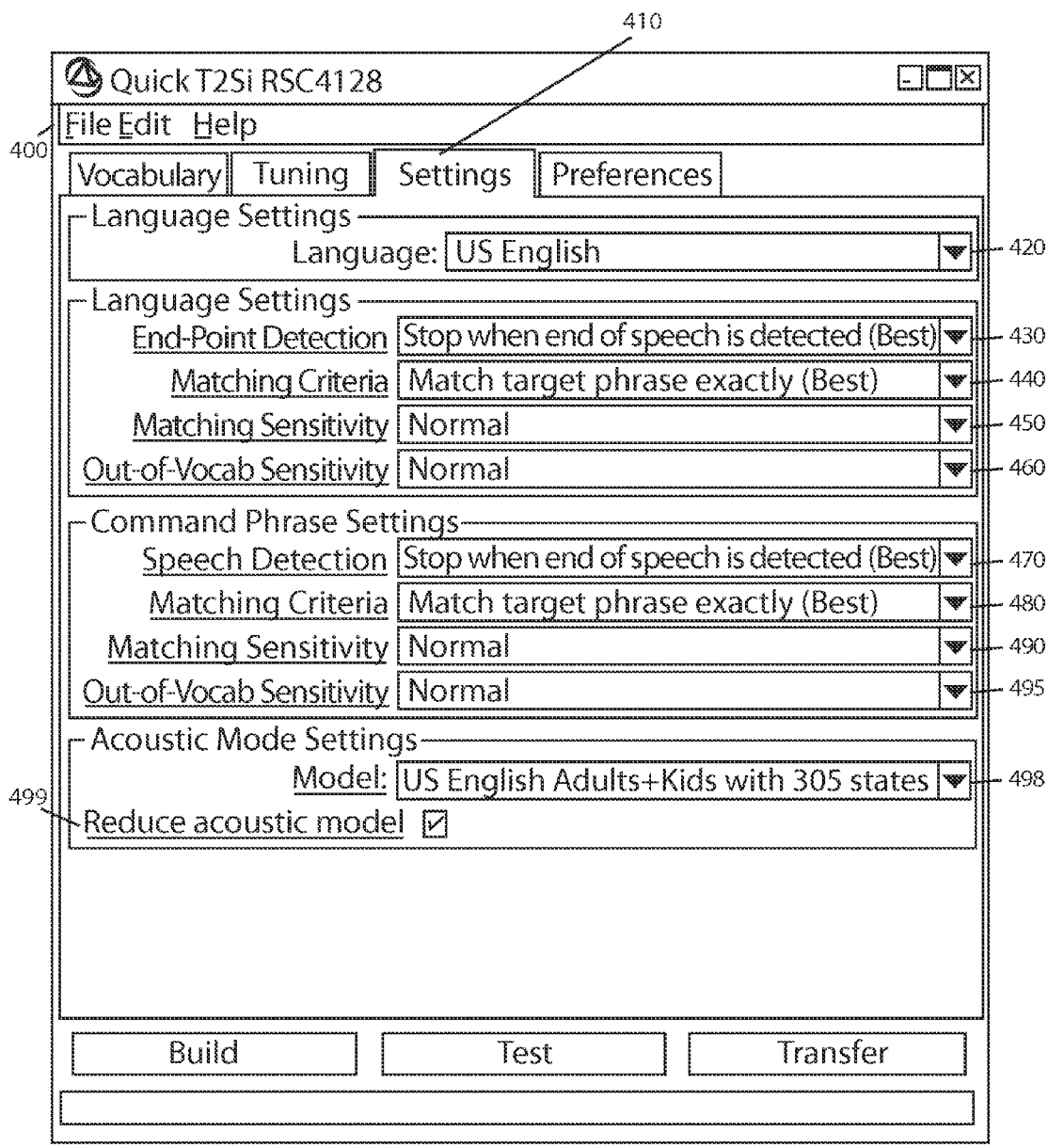
FIG. 4 illustrates one embodiment of the present invention where a user may interactively modify language, trigger phrase settings, command phrase settings and acoustic model settings.

Embodiments of the present invention may also include modifying other recognition parameters. A user may click on the "Settings" tab 410 to change various parameters and tool settings using the interface 400 shown in FIG. 4. For example, FIG. 4 illustrates one embodiment of the present invention where a user may interactively modify language, trigger phrase settings, command phrase settings and acoustic model settings. Command and trigger phrase settings may include end-point detection, matching criteria, matching sensitivity and out-of-vocabulary sensitivity for both the trigger phrase and command phrases. The example below describes the trigger phrase menu settings 430-460, but it is to be understood that the same settings may be used for command phrases 470-495. For example, duplicate settings may exist for the trigger phrase and command phrases, allowing a user to select different behavior for each. The trigger phrase setting may be programmed to be stricter than command phrase settings so as to reduce the likelihood of false triggers.

Supported languages and dialects may be listed in a "Languages" pull-down menu 420. FIG. 4 shows that the selected language is "US English." However, other languages could be chosen through the pull-down menu. Each language has its own writing system and phone set, and switching the language after a vocabulary has been defined seldom makes sense. Typically the vocabulary should be cleared before the language is switched. Some dialects can be switched without too many problems; e.g. switching from US English to Australian English will only makes sense if all the words are pronounced the same in both dialects. Even though they share the same writing systems, the phone sets are different.

As mentioned above, the recognizer needs to determine whether the user has finished speaking so it can return the recognition result; this is called "end-point detection." Embodiments of the present invention may allow a user to adjust "end-point detection" as exemplified by pull-down menu 430. The first setting, "Stop when end of speech is detected (Best)," is the most reliable method that involves waiting for a sufficiently large amount of silence (300 ms) to conclude the user has finished speaking. The second setting, "Stop immediately when target phrase is detected" (not shown), may be selected using pull-down menu 430. The second setting involves stopping as soon as the recognizer is sufficiently confident that it has seen a phrase from the vocabulary; this is called "early-stop end pointing." In an HMM-Viterbi implementation set forth as an example implementation below, a fundamental difference between the two methods is that the first selects the best recognition result from the highest scores for each phrase, whereas the second simply takes the first sufficiently high score it encounters.

Recognition problems may also be caused by confusion between similar sounding words, in which case a more discriminating vocabulary choice may be the best solution. Better rejection of out-of-vocabulary phases and more aggressive word-spotting settings may also be needed. Embodiments of the present invention also include a recognizer that supports different matching criteria that involve the insertion of a "catch-all" element around the expected utterances. A catch-all element allows the target phrase to be recognized when embedded in an unspecified context. The use of a catch-all element is sometimes called "word-spotting." Embodiments of the present invention may include a pull-down menu 440 including no word-spotting ("Match target phrase exactly (Best)"), word-spotting before the recognition phrase ("Allow extra words before target phrase," not shown), word-spotting after the recognition phrase ("Allow extra words after the target phrase," not shown) or word-spotting before and after the recognition phrases ("Allow extra words before and after the target phrase," not shown). For example, depending on the "Matching Criteria" selected, the relationships in a grammar may be modified to include a background model or silence before and/or after the utterance.

A user can also modify the "aggressiveness" or "sensitivity" (i.e., Matching Sensitivity) of the word-spotting model using "Matching Sensitivity" pull-down menu 450. Menu 450 may include "Allow Most Extra Words," "Allow More Extra Words," "Normal," "Allow Fewer Extra Words" and "Allow Fewest Extra Words." "Allow Most" will tune the recognition parameters to allow for an easier match of surrounding out-of-vocabulary words. Thus, the recognizer will err in favor of out-of-vocabulary words (i.e., more aggressive recognition). For example, in one embodiment a background model may be included as part of the acoustic model. When more aggressive recognition is desired, the impact of background model is increased. When less aggressive recognition is desired, the impact of the background model is decreased. Thus, "Allow Most" may cause the background model to outscore words in the vocabulary more often.

If the intended behavior is for the recognizer to easily pick out a phrase out of a longer utterance, then select one of the top options. If the recognizer favors shorter words in the vocabulary, then select one of the bottom options. If on the other hand, the recognizer is frequently recognizing a short phrase when a longer phrase is spoken, move this selection closer to the "Allow Fewest" setting, one step at a time. As an example, consider the two words "declaration" and "nation" that have similar endings. If the word-spotting is too aggressive, it will match everything up to the final "/ation/" and the recognizer will often confuse the two words. If the word-spotting is not aggressive enough, then the phrase "the nation" will be recognized as "declaration." It is preferable to modify the "Matching Sensitivity" setting only after verifying pronunciations and then testing the recognizer in the desired environment and verifying that it is not correctly picking out the phrase.

In one embodiment, each recognition result may be assigned a recognition score that is the ratio of how well the acoustics matched the expected pronunciation and how well the acoustics matched a "catch-all" model, such as "NOTA." When the "catch-all" model out-scores the words in the recognition set, the phrase is rejected and it is assumed that an out-of-vocabulary phrase was spoken. For example, referring again to the grammer in FIG. 3D, if a user wants to recognize one of the words "one," "two" and "three," the grammar will be: optional silence followed by one of "one," "two" or "three," followed by silence. The grammar may be modified to include the word "*nota," and the grammar becomes: optional silence followed by one of "one," "two," "three" or "*nota," followed by silence. If the recognizer recognizes "*nota," then the recognizer assumes something out of vocabulary was spoken, otherwise we will always recognize "one," "two" or "three." Amplifying the acoustic model for the "*nota" node in the grammar, will result in it beating out the other paths more often, and reducing it will result in it beating out the others less.

Embodiments of the present invention may also allow a user to tune other recognition parameters. For example, graphical user interface 400 allows a user to specify a particular acoustic model and a specific number of states using pull down menu 498. Additionally, a user may specify whether or not acoustic model reduction (alternatively "Vocabulary Compression") should be used (menu item 499 and associated check box). This is also referred to as "collapsed states," and is described in more detail below.

With regard to acoustic model menu 498, a set of acoustic models that vary in "target population" and "model size" may be provided for each language. Some applications are targeted to a specific age group, and if that age group exhibits distinctive acoustic behaviors, then accuracy can be increased through the use of a population specific model (e.g., children of a young age pronounce certain sounds less precisely, but predictably so). While it is important to model these population differences as precisely as possible, it is also important to allow for out-of-population input. The provided models may therefore be trained on a mix of speech from mostly the target population but with a representative sample of generic speech from that language.

Furthermore, some implementations may include acoustic models with more precise modeling of the acoustics. These models are larger in size and require more run-time resources to perform recognition. A user may select the largest model (i.e., most precise; largest number of states) that fits a recognition set. However, if the target system runs out of resources, a user may reduce the model size to allow for larger vocabularies. For example, in one embodiment, "Model" pull-down menu 498 may include "US English Adults+Kids with 305 states," "US English Adults with 161 states," "US English Adults with 407 states," "US English Adults+Kids with 161 states," "US English Kids with 157 states," and "US English Kids with 305 states.

Embodiments of the present invention also may give a user the option to include the full acoustic model or prune away (i.e., reduce) everything that is not needed to cover the specified recognition set (trigger and command phrases). Pruning the model leads to a significantly smaller data size. Some applications might require new vocabularies to be added at a later time from the initial design process, in which case the model should not be pruned. For example, if the vocabulary is dynamic and downloaded, the download bandwidth is minimized by pre-storing the complete acoustic model. A pruned model might not contain some outputs needed by the new vocabulary. For another example, when multiple vocabularies are combined into a single application using the "net combiner", pruning should be delayed until all the vocabularies have been combined. A grammar may be compiled (i.e., the reasoning from words and their order through to the nodes of the final grammar specification and the optimizations) on the device or offline (e.g. in the PC GUI). For some applications, the grammar is not known until the device is being used, or the grammar can be updated as a result of external events. In such cases the compiler has to run on the device where the recognition occurs. So the split is whether grammar compilation is done offline or on the recognition system. If the compiler runs on the recognition system, then the full acoustic model has to be stored on the device, since you would need to know the grammar before it can be pruned.

Poorly configured audio devices may also cause recognition problems. For example, if the recording gain is too low, the recognizer will be "deaf" to a user's speech input. Increasing the gain to a level where a user's speech is detected can improve recognition, but the gain should be low enough to ensure that the input is not clipped and the signal distorted. Clipping leads to poor recognition performance. In one embodiment, the recognizer will detect a clipped signal and warn a user that the signal is distorted. When such a condition is detected, the system may automatically decrease the gain of the audio signal.

Figure 5:
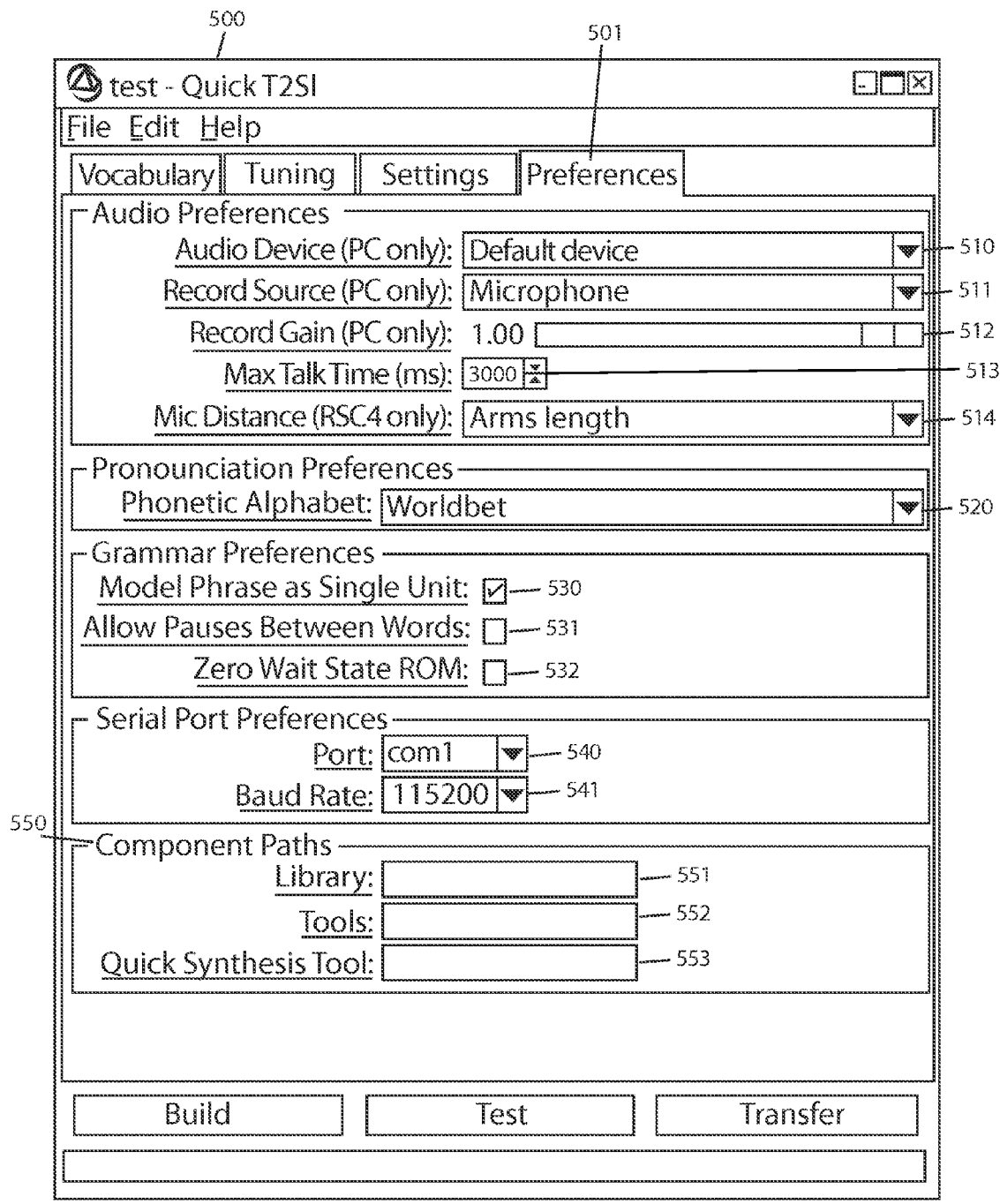
FIG. 5 illustrates a graphical user interface for setting the audio preferences, pronunciation preferences, grammar preferences, connection preferences, and software paths according to one specific embodiment of the invention.

Exemplary embodiments of the present invention also allow a user to set up preferences for operating the hardware or software or both. For example, FIG. 5 illustrates a graphical user interface 500 for setting the audio preferences, pronunciation preferences, grammar preferences, connection preferences, and software paths according to one specific embodiment of the invention. A user may access these preferences by mouse-clicking on the "Preferences" tab 501 in the GUI. Audio preferences may allow a user to configure the audio inputs and/or outputs of the target system. For example, if standard PC audio hardware is being used, and if the computer has only one audio device, a user will likely not have to change the default settings for the PC audio. However, if there is more than one audio device, a user may select the device that the microphone is connected to using "Audio Device" pull-down menu 510. Pull-down menu 510 may display a number of available audio devices, for example. Similarly, "Record Source" pull-down menu 511 allows a user to select "Record Source" (e.g., Microphone, Auxiliary, Line In, Record Master, CD Digital, MIDI, CD Audio, WAVE, TAD-In, SPDIF-In). Some non-standard audio hardware label the microphone as something other than "microphone." The "Record Source" pull-down menu may be used to configure such audio system, or if the microphone is connected to a line input, by selecting the appropriate input source in the pull-down menu. Audio controls may also allow a user to adjust the gain on the recording device as illustrated by the "Record Gain" slider control 512.

Embodiments of the invention may also allow a user to specify the maximum amount of time that a system will accept input, such as the "Max Talk Time" control 513. This setting typically only applies to command words, rather than trigger words. This sets the amount of talk time accepted by the recognizer in milliseconds. If the speech exceeds the specified time, the recognizer may return a "talked too long" error. Interface 500 also allows a user to set the microphone distance using "Mic Disance" pull-down menu 514. This setting adjusts the microphone gain to levels appropriate for the selected distance.

Figure 6:
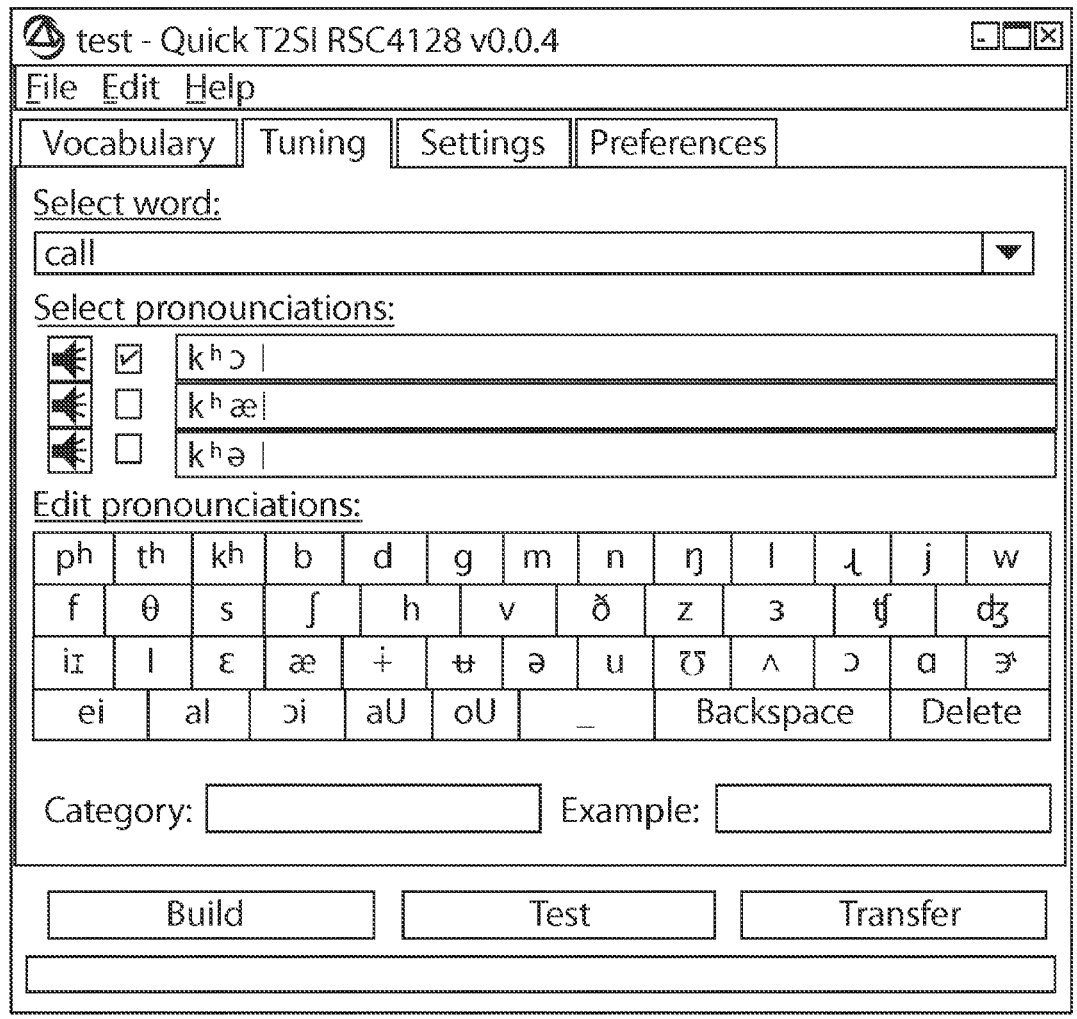
FIG. 6 illustrates another embodiment of the present invention where a user may tune a recognition set using the International Phonetic Alphabet and corresponding IPA keyboard.

As mentioned above, embodiments of the present invention may allow a user to select between various phonetic alphabets and variants of alphabets. Graphical user interface 500 includes a "Pronunciation Preferences" menu 520 for selecting "Phonetic Alphabets" from alphabets or variants of alphabets used for speech and linguistics. For example, a recent attempt at standardization is VoiceXML, which allows for "International Phonetic Alphabet" ("IPA"), "Worldbet" and "X-Sampa." While IPA is considered by some to be the most comprehensive, it is hard to read for individuals without linguistic training. It is also considered difficult to input because of the special character set that it uses. This has lead various groups to design their own alphabets for their language(s) of choice. Two attempts that allow for multiple languages and simple ASCII representations are "Worldbet" and "X-Sampa," of which "Worldbet" is considered by some to be the better and more complete alphabet closest to IPA and easiest to learn. Thus, the present embodiment uses "Worldbet" as the default choice. Users more familiar with IPA can select it as the representation used in the user interface. The phonetic keyboard interface described above allows for easy input of such alphabets. A user may specify a particular alphabet or other symbolic representation of the sounds in the recognition set using "Phonetic Alphabet" pull-down menu 520. For example, FIG. 6 illustrates another embodiment of the present invention where a user may tune a recognition set using the International Phonetic Alphabet and corresponding IPA keyboard. "Pronunciation Preferences" may also allow a user to turn on an "Expert Keyboard" so that complete pronunciations are presented to a user rather than simplified pronunciations. A checkbox (not shown) may be used to determine whether or not simplified for complete pronunciations are presented to a user.

Embodiments of the present invention may also allow a user to specify grammar preferences. Various grammar settings can be configured that affect the way the grammar gets compiled and/or executed. The Grammar Preference settings influence both the size and speed of the compiled grammar. For example, a user may specify that the system should model phrases as a single unit (checkbox 530), allow pauses between words (checkbox 531) or have a zero wait state ROM (checkbox 532). When phrases are modeled as a single unit, internal transitions between words constituting a phrase may not be tracked (e.g., in a Viterbi search described below). This greatly reduces the required bookkeeping and memory needed. Allowing pauses between words changes the grammar by inserting optional silences. This results in a path from word N to word N+1 that does have a pause and another path that does not have a pause. So it increases the number of possible paths that have to be analyzed. Having a zero wait state ROM means that the software can access the ROM without waiting one or more clock cycles for the ROM output to contain the correct quantity. Of course, these features would be associated with specific implementations.

Embodiments of the present invention allow a recognizer to be transferred to another system. In one embodiment, the vocabulary is compiled into binary form. Referring to FIGS. 2, 3A, 4 and 5, a user may press the <Build> button to start the compilation process. Table 2 is a list of files and filenames generated according to one implementation of the present invention.

TABLE 2

| File | Description |
| --- | --- |
| Trigger Phrase Application Header: | Defines software names for trigger task |
| Compiled Trigger Phrase Grammar: | Contains the compiled trigger grammar specification data file |
| Command Phrases Application Header: | Defines software names for command task |
| Compiled Command Phrases Grammar: | Contains the compiled command grammar specification data file |
| Application Binary File: | Contains the executable recognizer program |
| Compiled Acoustic Model | Contains the compiled acoustic model for both the trigger and command tasks |

The trigger phrase and command phrases may be compiled into separate files, which get linked with the application. The header files enable the application programmer to refer to each phrase symbolically when interpreting the recognition result.

As part of the building process, an application may be generated and downloaded to another system to test the vocabulary. Once the vocabulary has been built, the <Transfer> button may be enabled. For example, the PC or workstation may be connected to the target application hardware, and the application may be downloaded by clicking on the <Transfer> button. The PC may open a serial port and detect the hardware, and the downloading process may then be initiated.

Figure 7:
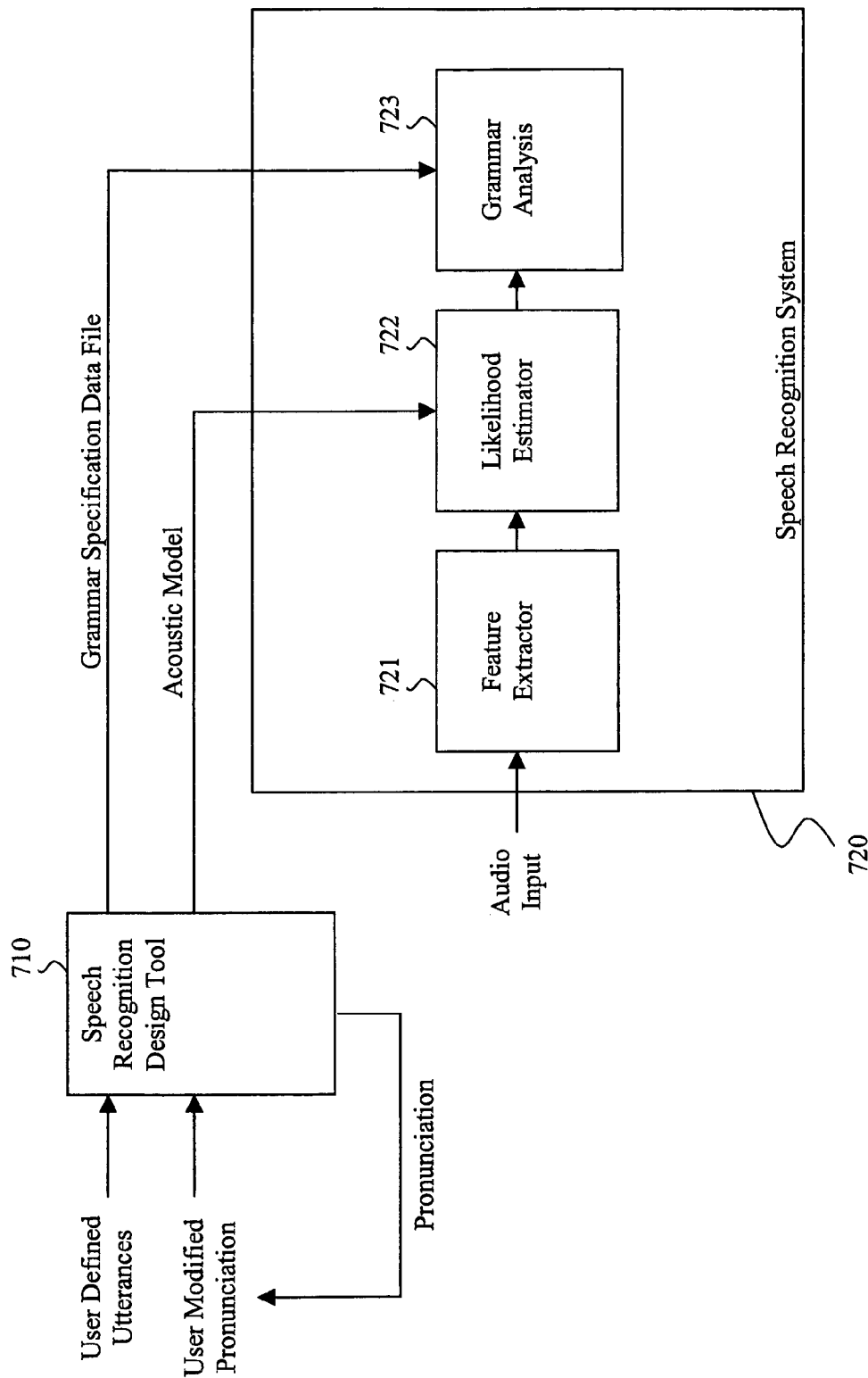
FIG. 7 illustrates a speech recognition design tool coupled to a speech recognition system according to one embodiment of the present invention.

FIG. 7 illustrates a speech recognition design tool coupled to a speech recognition system according to one embodiment of the present invention. Speech recognition design tool 710 may be a software design tool running on a personal computer or workstation computer, for example. A user defines utterances that are to be recognized by speech recognition system 720. Design tool 710 receives the utterances and generates one or more pronunciations for each utterance. The user may test the accuracy of the recognizer and tune the pronunciations on the PC or workstation, while monitoring the estimated resources that would be used by the speech recognition system 720. Testing may be accomplished, for example, by speaking into a microphone on the PC or workstation and providing the speech recognition parameters from the design tool to a software recognizer running on the PC or workstation. Once the user has tuned the recognition parameters to obtain the desired accuracy using an acceptable amount of estimated resources on recognition system 720, the user may then transfer the tuned recognition parameters to recognition system 720 to configure system 720 to perform the specified recognition operations.

For example, in one embodiment, design tool 710 configures recognition system 720 by providing an acoustic model and grammar specification data file. During a recognition operation, an audio input may be provided to recognition system 720. Recognition system 720 may include a feature extractor 721 for extracting acoustic information from the audio input. The extracted acoustic information is then input to likelihood estimator 722. Likelihood estimator 722 receives the acoustic information and outputs probabilities to grammar analyzer 723 that are generated based on the acoustic information in the audio input signal and the acoustic model received from design tool 710. In one specific example described in more detail below, likelihood estimator 722 is a neural network, the acoustic model comprises neural network weights, and the outputs of the neural network are a function of unique sounds in a language. For example, the outputs may be log likelihoods of subphones in the audio input signal. Grammar analyzer 723 completes the recognition operation using the probabilities from likelihood estimator 722 together with the grammar specification data file received from design tool 710. In one specific example described in more detail below, grammar analyzer 723 uses a Viterbi Search algorithm based on the grammar specification data file from design tool 710 and probabilities received from likelihood estimator 722 to complete the recognition operation.

Figure 8:
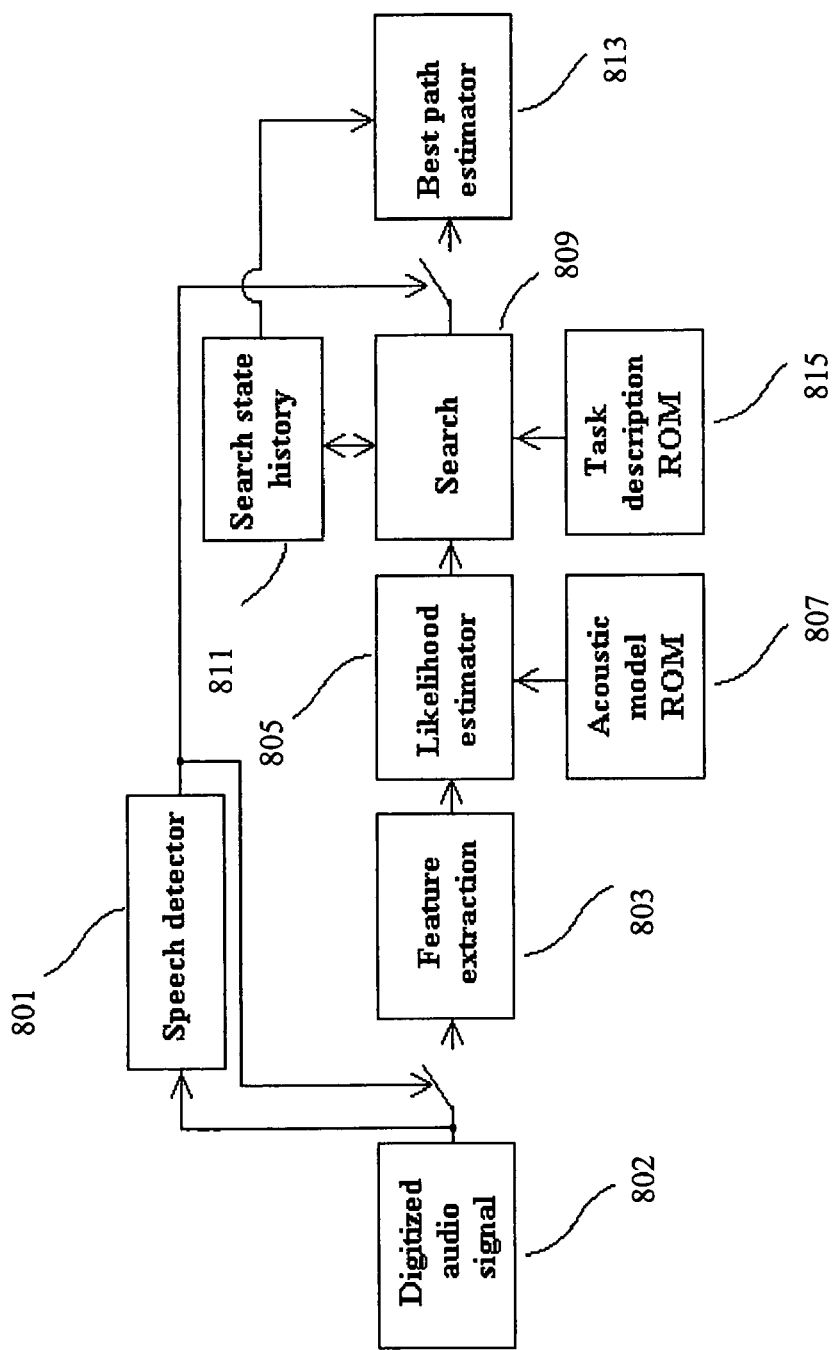
FIG. 8 is a specific example of a logical organization of a recognizer according to one embodiment of the present invention.

FIG. 8 is a specific example of a logical organization of a recognizer according to one embodiment of the present invention. Embodiments of the present invention may include speaker independent recognizers that are either Hidden Markov Model (HMM) or segmental recognizers. As illustrated in FIG. 8, both of these may use speech detector 801, feature extractor 803, likelihood estimator 805 based on an acoustic model stored in memory 807 (e.g., a Read Only Memory or "ROM") and a search mechanism including search 809, search state history 811, best path estimator 813, and a task description such as a grammar specification data file stored in memory 815 (e.g., a task description ROM). Embodiments of the present invention include a recognizer having speech recognition parameters produced by the design tool described above and stored in memory such as a RAM, SRAM, ROM, EEPROM, EPROM, flash, or any other well known storage medium that can be accessed by likelihood estimator 805 and search 809.

Digitized audio signal 802 is monitored by speech detector 801, which frames the utterance of interest in time, if needed. Feature extractor 803 extracts acoustic information from digitized audio signal 802 into features that provide a measure of immunity to extraneous backgrounds as well as maximal discrimination of different speech sounds. Likelihood estimator 805 uses the feature data in conjunction with information from acoustic model 807 to provide likelihood estimates to search 809. Search 809 matches the time sequence of features to an expected grammar specification. The history of search results, kept in search state history 11, is used to find the most likely match in best path decoder 813. To enable the search to complete in a limited time, rather than performing an exhaustive search, an optimized search may be performed that considers only the locally most likely matches. Such searches are called Viterbi searches or variants thereof.

In one embodiment of the invention, a speech recognition system includes a filter-bank feature extractor, a neural net ("NN") acoustic model and a specialized Viterbi search including a Hidden Markov Model ("HMM"). The entire system may be implemented on a single LSI system-on-chip (SOC), for example. A neural network acoustic model may be preferable to a Gaussian mixture model or other models in small recognizers because the calculation is highly optimized in a vector processor. The calculation may be optimized further by calculating only the output layer vector inner products of those models currently under consideration in the search. The neural network may include weights trained on a corpus of recordings of speech in a given language and used for a plurality of recognition sets without retraining the network. In one embodiment, the acoustic model describes subphones comprised of three parts, the first part depending on the prior subphone, the second part being context independent and the third part depending on the following subphone. In another embodiment, the acoustic model is calculated totally independent of the search calculations, allowing for parallel processing and pipelining of the algorithm. Additionally, the NN acoustic model may access the ROM linearly and once for each frame of features, allowing for a highly optimized path and inexpensive memory for the storage of the model parameters.

Because of the cost-effective design, the device may be used in cost sensitive applications such as toys, electronic learning aids, and consumer electronic products. Such a chip may include an analog front-end, an analog-to-digital converter, a recursive, multi-pole, digital filter, a vector processor for neural net calculations, a general-purpose microprocessor, and a digital-to-analog converter for producing synthetic speech prompts. These are all of the elements required for a complete speech recognition application except the microphone, speaker, and battery.

Figure 9:
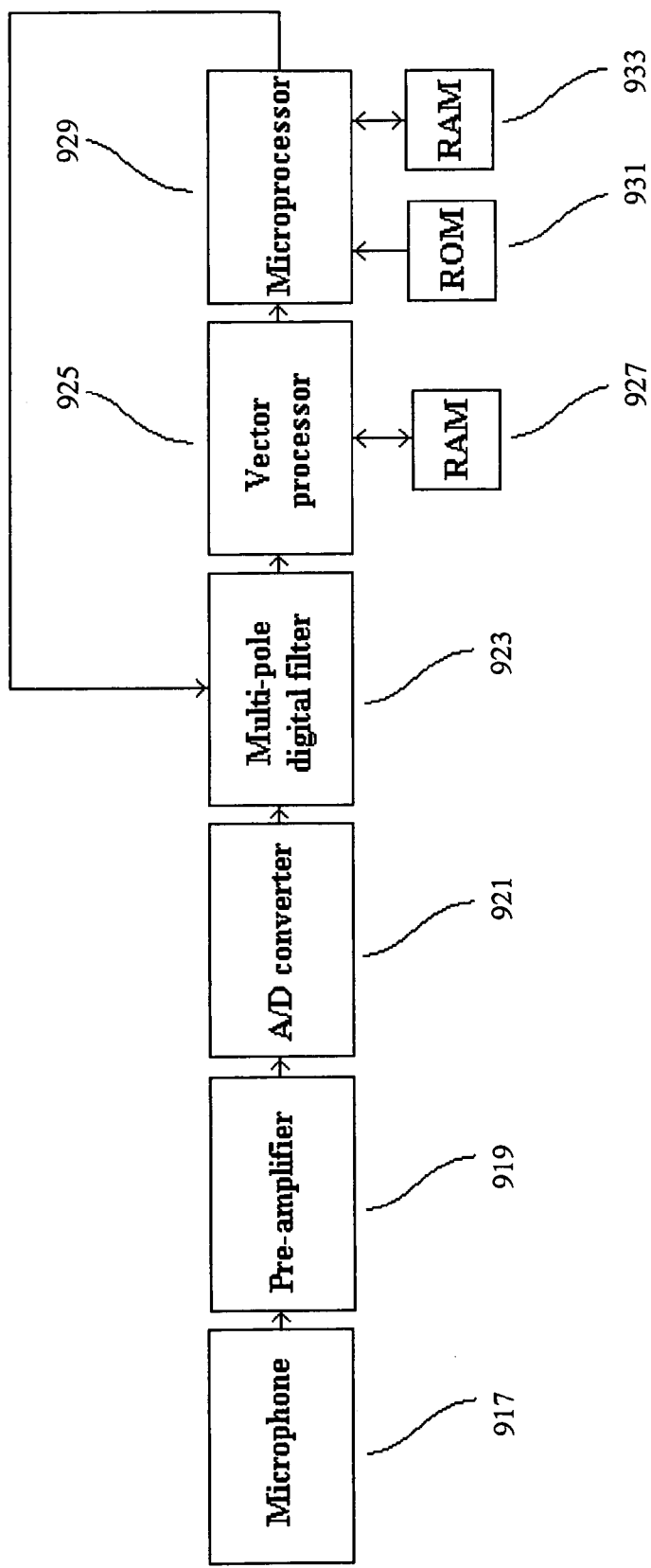
FIG. 9 is a block diagram of the speech recognition electronics according to one embodiment of the present invention.

FIG. 9 is a block diagram of the speech recognition electronics according to one embodiment of the present invention. FIG. 9 illustrates some of the building blocks used in the recognition process and the logical flow of such blocks. However, the block diagram in FIG. 9 should not be interpreted as limiting the wide range of possible circuit connectivities that might exist in an actual circuit implementation. Additionally, it is to be understood that the following description is just one example of how certain aspects of the present invention may be implemented. Speech recognition electronics may include microphone 917, pre-amplifier 919, analog-to-digital (A/D) converter 921, multi-pole digital filter 923, vector processor 925 and its associated RAM 927, microprocessor 929, ROM 931, and RAM 933. These components may comprise the major elements incorporated into an SOC that performs recognition functions according to embodiments of the present invention. Analog-to-digital converter 921 converts the incoming analog audio waveform into 16 bit digital representations at 18,636 samples/second (54 microseconds per sample), and may be a sigma-delta converter of a type that is well known in the art. The digital output of analog-to-digital converter 921 is fed to multi-pole digital filter 923 whose operation is described below. After being programmed by microprocessor 929, operation of the analog front-end and multi-pole digital filter 923 proceeds continuously without further microprocessor intervention.

Multi-pole digital filter 923 repetitively performs the following calculations on input data X(n) at sample time step n to produce the output data point Y(n), and two intermediate results, Z1(*n*) and Z2(*n*).

$$Y(n)=A0X(n)+Z1(n-1) \quad (1)$$

$$Z1(n)=A1X(n)-B1Y(n)+Z2(n-1) \quad (2)$$

$$Z2(n)=A2X(n)-B2Y(n) \quad (3)$$

Equations (1)-(3) describe a general second-order Infinite Impulse Response (IIR) digital filter, having the transfer function $$H(z)=(A0+A1z^{-1}+A2z^{-2})/(1+B1z^{-1}+B2z^{-2}) \quad (4)$$

IIR digital filters are well known in the digital signal processing art. Equations (1)-(3) are written in a form to emphasize the intermediate data, Z1, Z2, which are stored in memory internal to the filter unit of the SOC. The coefficients A0, A1, A2, B1 and B2 determine the filter characteristics of the second-order section. When A2=B2=0, the equations specify a first-order section. For hardware simplicity and cost savings, certain constraints apply to the coefficient values that can be realized. Namely, every multiplication step in equations (1)-(3) is executed by no more than three add and three shift operations without use of a hardware multiplier. The allowed locations of transfer function "zeroes" are highly constrained. The specific hardware implementation of the preferred embodiment forces A1=0 for second-order sections. In this case, the equations specify a bandpass second-order section with zeroes at 0 and the Nyquist frequency. Second-order poles may be real or complex. First-order sections must have real poles. The first-order section is high-pass (zero at 0 frequency) if A1=−A0, and low-pass (0 at Nyquist frequency) if A1=+A0.

The values of A0, A1, A2, B1, and B2 for each filter section and additional filter control information are provided to multi-pole digital filter 923 by microprocessor 929. The control information defines the cascade and parallel interconnections of multiple first- and/or second-order sections to realize twelve separate frequency-selective bandpass filters. Depending on the specific control and coefficient values, the set of equations (1)-(3) can be calculated from 45 to 90 times in the 54 microsecond interval between digital samples of the input waveform.

The outputs of the twelve frequency-selective digital filters are provided to twelve summing circuits, each of which sums the absolute value of 512 amplitudes of the filtered signal. These twelve summed outputs are provided to the microprocessor 929 every 512 samples, or approximately 27 milliseconds, which time period is called a frame. Microprocessor 929 reads the filter outputs, converts them to logarithmic form, subtracts noise levels, and normalizes all twelve values. These twelve values for each time frame are then stored in RAM memory 927 of vector processor 925 in preparation for generating acoustic features. The twelve values stored to RAM are collectively called a "block."

The blocks constituting the outputs of the twelve frequency-selective bandpass filters are used to create a 36-element Acoustic Feature vector. The Acoustic Feature vector is the input to the Acoustic Model Neural Net. The feature vector consists of three parts:

1) the twelve values of the block, after scaling and offsetting
2) a "delta" portion, described below
3) a "delta-delta" portion described further The delta and delta-delta portions of the feature vector provide the neural net with a time window wider than a single frame. The delta calculation for frame time n is:

$$D(n,k)=\Sigma_i(WD(i)*B(n+3-i,k)) \quad (5)$$

where k is the kth of twelve elements of the block, B, WD(i) is the Delta coefficient, and $\Sigma_i$, the sum_over_I, ranges from 1 to 5. This is seen to be a 5-point Finite Impulse Response (FIR) filter centered on the block at time n (e.g., a weighted average of 5 blocks). The WD(i) coefficient is independent of k, so the identical delta calculation is performed on each of the twelve elements of the block array, B. The delta-delta calculation is also a FIR filter, but one with 9 points centered on the block at time n, and with different coefficients (e.g., a weighted average of 9 blocks). The identical delta-delta calculation is performed on each of the twelve elements of the block. The neural net thus receives inputs spanning 9 blocks or 27*9=243 milliseconds. This allows the Acoustic Model neural net to estimate the probabilities of subphones in the context of other subphones. The FIR filter calculations are performed using vector processor unit 925. The size of the final Acoustic Feature Vector is 36 16-bit words.

The 36-word feature vector, F[36] is input to the first layer of the Acoustic Model neural net, trained as described below. The second "hidden" layer consists of an arbitrary number of nodes, but is typically 70. The number of hidden nodes is small enough to allow for good generalization and better performance in varying environments such as noise. It is large enough to allow for enough free parameters in the net to model the acoustics of the various subphones in a language. The calculation for each of these 70 nodes, n, is $$H(n)=\text{Sigmoid}(\Sigma_i(W(i,n)*F(i))) \quad (6)$$

where $$\text{Sigmoid}(x)=1/(1+\exp(-x)) \quad (7)$$

and $\Sigma_i$ has 37 terms including a constant "bias" term.

W(i,n) are the neural network weights for the hidden layer and the $\Sigma_i$ term is the well-known vector inner product. In one embodiment, this calculation is performed by vector processor 925. The vector processor is first programmed with the starting address in ROM 931 of the appropriate neural net weights array for node n, W(0,n), the starting address of the feature vector in vector processor RAM 927, the number of summations to perform (36), and the size of each element (2 bytes). Microprocessor 929 then gives the command to calculate, which proceeds automatically without further intervention by the microprocessor. The calculation of each hidden layer inner product takes 13 microseconds. The sigmoid function is performed in software, and the value of H(n) is stored back into a different portion of vector processor RAM 927.

The second, or output, layer of the Acoustic Model neural net consists of an arbitrary number of output nodes, but is typically in the range of 100-400. During operation each of these outputs represents the current acoustic likelihood, L(m), for one specific subphone, m, of the language. FIG. 10 illustrates the outputs of an Acoustic Model neural network along with the subphones corresponding to each output for a specific implementation of the present invention. As mentioned above, each subphone corresponds to a phone supplemented with contextual information.

As described in detail below, the design tool may prune this output layer so that the neural net supplied to the SOC may contain only outputs needed for a specific vocabulary. Typically this ranges up to 120 outputs or so depending on the vocabulary. The calculation for each of these 120-odd nodes, m, is:

$$L(m)=\text{Log}(\text{Sigmoid}(\Sigma_i(WO(i,n)*H(i)))) \quad (8)$$

As in the case of the hidden layer, vector processor 925 performs the vector inner product calculations for the output layer. Because of the increased number of terms calculated (70 instead of 36), each output layer vector inner product requires 25 microseconds. The Sigmoid and Log operations may be performed jointly in software, and the final output likelihood, L(m), of each subphone is stored in memory to be used in the Viterbi search.

In one embodiment, the speed performance of the operation is improved by performing the likelihood calculations in equation (8) only for output probabilities that are actively being used in Viterbi search 809. The search communicates information about which output nodes (i.e., subphone probabilities) are needed at each frame, and only these likelihoods are calculated for the next frame.

Figure 11A:
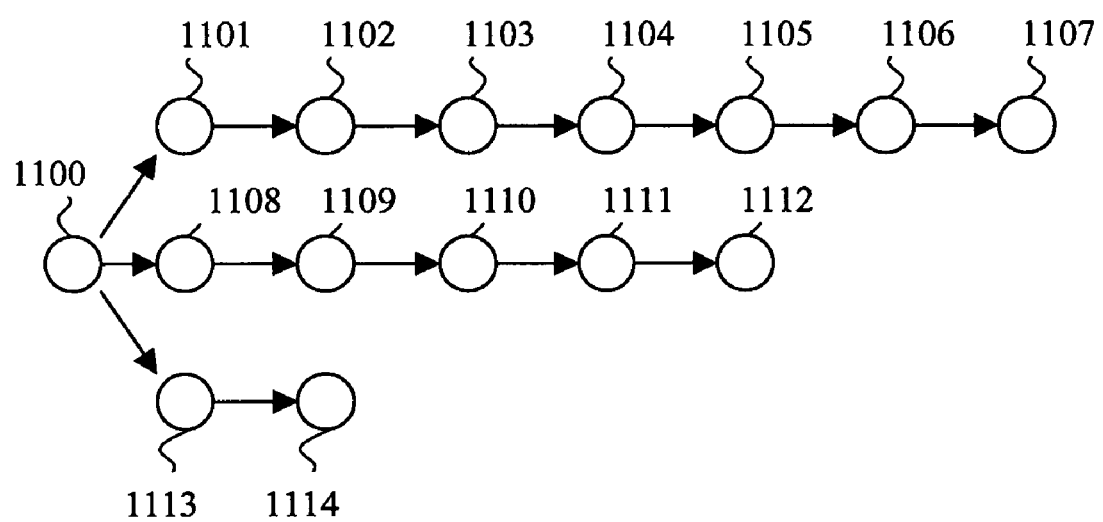
FIG. 11A illustrates nodes for a simple path sequence for the words "yes" and "no."

The acoustic evidence is then matched to the task description. For example, the probabilities for each subphone may be inputs to an analysis component, such as a Viterbi Search, and combined with information in the grammar specification data file to produce recognition results. FIG. 11A illustrates grammar specification nodes for a simplified path sequence for the words "yes" and "no." Each node in the grammar specification has one associated subphone (or more than one if the states are collapsed) and is part of a possible path through the description. The recognition process can be thought of as finding the optimal sequence of nodes to visit, starting from one of the allowable initial nodes and ending at one of the final nodes. The path is optimal if it matches the acoustics best. In other words, if a score is assigned to how well the model associated with a node describes the acoustics at that time, then the optimal path will have the best product of these scores, compared to all other possible paths.

The likelihood of a specific model is known from neural net acoustic model 807 described above. This likelihood is used as the matching score. For numerical reasons, it is not practical to implement the above algorithm as described. The scores grow smaller and smaller and the dynamic range needed to represent them exceeds most representation forms. In a practical implementation, the raw scores (i.e., the acoustic model score and the penalties) are converted to logarithms and the algorithm is performed in the logarithmic domain. All multiplies become additions and divisions become subtractions. The representation problem is solved by this approach, and the arithmetic operations are faster to implement.

The search for the optimal path proceeds as follows:

At time 0, activate each possible starting node with a score of 1, and initialize the best current score as 1.

For each frame of acoustic likelihoods from the acoustic model, and for each node in the task description:

If the node is active and if the ratio of the score of the node and the best current score is less than a threshold, deactivate this node, unless it was only activated in the previous frame.

For each of the next allowable nodes connected to this node that are active:

calculate the score of this next node if we would transition into it. This score is the product of the score of the current node and a transition penalty, which is 1 in most cases, but less than one if the time it spent in the current node is too small. The range of duration that should be spent in a node is a function of the acoustic model, and its place in a sentence and word and includes whether or not it is an emphasized subphone. The minimum and maximum duration is compiled into the node description by the search compiler.

if this score is better than the score of any current "entering" node into this next node, replace the score of the best next score for this next node, and keep track of the current node that resulted in that score.

For the current node, calculate the score of staying in this node, which is the product of the current score and 1, except if the time it has spent in this node exceeds the allowable maximum. If current node score is better than any current "entering" score, replace that score with the current node score and keep track of the fact that this is a self-transition.

Zero out a lookup table that has one entry per acoustic model and cycle through each node again, and if it is active, calculate the new score of the node as the product of the best entering score and the likelihood score from the associated acoustic, model.

If the best "entering" score originates from a different node, zero the time that has been spent in this node. If this node is the first node of a word, then record this transition by placing a record in scratch memory. These records are organized such that the full transition history up to this point can be recovered.

If the best "entering" score originates from a different node, activate all the possible next nodes with a score of zero.

Activate the bit in the lookup table for the acoustic model associated with this node to indicate that it should be evaluated in the next frame.

Cycle through the scratch memory and remove all references to transitions of paths leading to nodes that were just deactivated.

If this is the end of the utterance, then search through the active nodes for the nodes that are allowable final nodes and find the best scoring node. Then track the path history through the transition history. From this determine the sequence of words that best explains the acoustics. Similarly the path associated with the next best score would be the next best result.

Referring again to FIG. 11A, the algorithm described above can be used to transition between nodes 1100-1114 to produce a recognition result. For example, a recognizer may include a network similar to the one shown in FIG. 11A, typically implemented as a software algorithm. In one embodiment of the present invention, the grammar specification data file describes the interconnections necessary for recognizing particular utterances (e.g., "yes" and "no" as shown in FIG. 11A). There is typically one start node and paths for each utterance in the vocabulary, and typically, but not necessarily one end node. Each utterance may further include additional branches and sub-branches corresponding to different pronunciations. Such branches or sub-branches may include additional nodes corresponding to alternate subphones (not shown) associated with the different pronunciations.

The start and end nodes are typically silence and each node corresponds to one or more "subphones" associated with one of the outputs of the neural network. Each node has associated information, such as the identity of the subphone or subphones associated with the node and a value or score of the node at a given time corresponding to a cumulated likelihood that the given node is where you are in the network at a given time. Each node in the network represents a sound and a transition. One possible implementation for recognizing an input is to use a Viterbi search, an example of which is described above. A Viterbi search is the process of calculating a score for each node based on previous score, the value received from the neural network for this particular subphone at a particular time, and the score of the preceding node.

The process starts at node 1100, which may be silence (e.g., ".pau"). From node 1100, the system may transition into one of three nodes: node 1101 (subphone=j-Lo), node 1108 (subphone=n-Lo) or node 1113 (subphone=NOTA). In FIG. 11A, nodes 1101-1107 correspond to the path taken if the input utterance is "yes." Thus, the nodes in the path may correspond to the following sequence of subphones: node 1101=j-Lo, node 1102=j-Ro and P:j, node 1103=E-Lg, node 1104=E-R:s and P:E, node 1105=s-L:E, node 1106=s-R:.pau, W:yes, P:s, and node 1107=.pau (i.e., silence). Nodes 1108-1112 correspond to the path taken if the input utterance is "no." Thus, nodes in this path may correspond to the following sequence of subphones: node 1108=n-Lo, node 1109=n-Rbvd and P:n, node 1110=oU-Ln, node 1111=oU-Ruc and Wino and P:oU, node 1112=.pau. Nodes 1113-1114 correspond to the path taken if the input utterance is not in the vocabulary. An alternate path is defined for capturing out of vocabulary utterances and is referred to as the NOTA path (i.e., none of the above). Thus, nodes in this path may correspond to the following sequence of subphones: node 1113=.nota and node 1114=.pau. It is to be understood that node 1107, node 1112 and node 1114 could be combined into a single ".pau" node representing the silence at the end of an input speech signal.

FIG. 11B is an example of the information that may be included in a grammar specification data file. Each of a plurality of nodes, hereinafter "states" (e.g., state0-state14 in column 1120), have associated state information. The grammar specification data file information in FIG. 11B is embodied in C source code for illustrative purposes. The information shown describes features of a grammar. Each row in column 1120 represents a different state (e.g., states 0-14 corresponding to nodes 1100-1114 in FIG. 11A; state0 is silence, states1-7 correspond to "yes," states8-12 correspond to "no," and states13-14 correspond to NOTA.

The rows in column 1124 designate the word corresponding to the state. For example, in states 0, 7, 12 and 14 column 1124 is "0." So the word for these states is the same—silence. The value for column 1124 in states 1-5 and 8-10 is "255," which means that there is no word associated with these states (i.e., these are intermediary states and not word ending states).

The rows in column 1122 represent the subphone number for the state. For example, state0 has a subphone number "0" corresponding to silence, state1 has a subphone number "3" corresponding to "j-Lo" (the left context of the "j" sound) state2 has a subphone number of "4" corresponding to the "j-Ro" (the right context of the "j" sound), and so on. The subphone corresponding to the subphone numbers shown in column 1122 are shown as comments in the last column of each state.

The rows in column 1125 designate possible states that the current state can transition into. For example, state0 has three values (e.g., 1, 8 and 13) for column 1125, which indicates that state zero can transition into three different states. However, state1 only transitions into state2 in this example.

The rows in column 1121 represent "bit flag" information for state conditions such as grammar initial, grammar final, NOTA and in-vocabulary. The rows in columns 1123 contain state minimum and maximum durations and transition penalties. A grammar specification data file may also include global data that apply to all states. These data may make the search software more efficient and may communicate information about the acoustic model to the search. Such data may include bit-flags (such as trigger grammar), the number of states, the neural net output size, values for the "garbage", background, and catch-all (collectively "extra") models, the number of outputs in the likelihood (probability) array, the number of words in the vocabulary, an index to help the software locate the "garbage model", penalty values for leaving any state too soon or staying there too long, and a beam size used to control the threshold for de-activation of states. The global data may also communicate application information to the search, such as the expected microphone distance and the maximum record time.

FIGS. 12A-B illustrate an array of likelihoods and a recognition path across a plurality of nodes for recognition of the word "CALIFORNIA." FIGS. 12A-B show the relationship between each of state 23-35 and an associated subphone number and subphone (e.g., state 23 is associated with subphone number 99—"kc-L:o"). At time "00," state 23 may be the active state, corresponding to the left context of the word "CALIFORNIA." In this example, the net calculates only outputs for active states; missing values near the upper right and lower left of FIG. 12A and at the lower left of FIG. 12B correspond to inactive states and are not calculated. At time=0 ("00") the log likelihood for the acoustic model associated with each state is as follows: state23=16, state24=58, and states25-35 are not calculated. At time "01," the likelihoods are recalculated and used to determine whether or not there is a state transition. FIG. 13 illustrates state transitions, cumulative likelihoods, previous likelihoods, current values, subphones, and the average that may be used to arrive at a recognition result. In FIG. 13, the sequence continues on after state 35 into state 212, which corresponds to subphone "0"—silence.

FIGS. 12 and 13 illustrate another feature of the present invention. In some circumstances, subphones may be collapsed into a single state (i.e., collapsed states). When a state is collapsed, two different "paired" subphones are associated with it. This allows a given size memory to handle bigger vocabularies than if the states were not collapsed. Collapsed pair states is a method of combining two nodes into one node. Two ordinary nodes can be paired when the second node is the sole "successor" of the first mode. The processing of a "pair" node initially proceeds as normal, with a flag indicating that it is using the first acoustic model associated with that node. The scores for any next nodes may be penalized by a sequence penalty. The score for the pair node is calculated as usual using the likelihood score for the acoustic model associated with the first node. Then, if the likelihood of the acoustic model associated with second node is greater than the likelihood of the acoustic model associated with the first node, the node flag is changed to indicate that it is using the acoustic model associated with second node. At the next frame the node score will be calculated using the likelihood score for the acoustic model associated with the second node. In this case, the scores for any next nodes are not penalized by a sequence penalty. Because of addressing limitations in the software and RAM limitations in the hardware, this method allows larger vocabularies and also speeds up recognition.

Collapsed states are illustrated in FIGS. 12 and 13. For example, state 25 has two subphones: 104 (i.e., "kh-R:f") and 27 (i.e., "@-L:s") as shown in FIG. 13 at frames 7 and 8. The system transitions between subphone 104 and 27 while staying in state 25. A similar inter-node transition happens at time 11, 15, 19 and 23. At those frames the second subphone of a pair is being used. Although "pairs" are described above, the collapsing concept is general and is not limited to two nodes. It can be done for any sequence of consecutive nodes where each node except the last has a single successor.

There are advantages of using the speaker-independent speech recognizer of the current invention in combination with other technologies. For example, the recognizer of this invention may be used with speaker verification that runs in the same hardware and that prevents unauthorized users from accessing the product containing the invention. Alternatively, embodiments of the invention may be used in conjunction with a speaker-dependent recognition algorithm that runs in the same hardware and that allows a user to input vocabularies specific to a particular application. Furthermore, a speaker-dependent algorithm could be combined with the speaker-independent algorithm to recognize utterances that may be either speaker dependent or speaker independent phrases. Moreover, embodiments of the present invention may be used in conjunction with a low power wakeup circuit that activates the recognizer of the current invention upon receipt of a specific audio signal. In this way, the system can be active all the time without draining significant battery power, and without requiring an off/on switch.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims. The terms and expressions that have been employed here are used to describe the various embodiments and examples. These terms and expressions are not to be construed as excluding equivalents of the features shown and described, or portions thereof, it being recognized that various modifications are possible within the scope of the appended claims.

What is claimed is:

1. A method of specifying a speech recognition operation comprising:
    receiving, on at least one computer, a recognition set from a user, the recognition set comprising one or more text words or phrases to be recognized;
    automatically generating a plurality of alternate phonetic representations of each word or phrase in the recognition set;
    displaying the phonetic representations to the user in a graphical user interface;
    generating a plurality of speech recognition parameters for the recognition set based on said phonetic representations;
    calculating, on at least one computer, an estimate of the resources used by a target system to recognize the words or phrases in the recognition set using the speech recognition parameters;
    displaying the estimate to the user in the graphical user interface;
    interactively modifying the phonetic representations, and in accordance therewith, modifying the speech recognition parameters, wherein the resources used by the target system are modified in accordance with the interactive modification of the phonetic representations; and
    redisplaying the estimate as the phonetic representations are modified.

2. The method of claim 1 wherein the phonetic representations are displayed on a keyboard.

3. The method of claim 1 further comprising performing a speech recognition operation on a local computer based on the speech recognition parameters.

4. The method of claim 1 wherein the speech recognition parameters comprise a first and second set of recognition parameters, wherein the first set configures a speech recognition system to respond to portions of words or phrases in the recognition set and produce a first set of intermediate results, and the second set configures the speech recognition system to analyze the intermediate results and produce a final result.

5. The method of claim 1 further comprising transferring the speech recognition parameters to the target system to configure the target system to perform a speech recognition operation.

6. The method of claim 5 wherein the target system includes a likelihood estimator and the speech recognition parameters include an acoustic model transferred to the likelihood estimator.

7. The method of claim 6 wherein the acoustic model includes neural network weights.

8. The method of claim 5 wherein the target system includes a grammar analyzer and the speech recognition parameters include a grammar specification data file transferred to the grammar analyzer.

9. The method of claim 8 wherein the grammar specification data file includes instructions for configuring a search algorithm on the target system to analyze acoustic information against all words or phrases in the recognition set over a given time interval.

10. The method of claim 1 further comprising generating synthesized audio corresponding to the phonetic representations so that the user may interactively modify the phonetic representations and improve recognition accuracy.

11. A method of making a speech recognition device comprising:
    receiving, on at least one computer, a recognition set from a user, the recognition set comprising one or more text words or phrases to be recognized;
    automatically generating a plurality of alternate phonetic representations of each word or phrase in the recognition set;
    displaying the phonetic representations to the user in a graphical user interface;
    generating a plurality of speech recognition parameters for the recognition set based on said phonetic representations;
    calculating, on at least one computer, an estimate of the resources used by said speech recognition device to recognize the words or phrases in the recognition set using the speech recognition parameters;
    displaying the estimate to the user in the graphical user interface;
    interactively modifying the phonetic representations, and in accordance therewith, modifying the speech recognition parameters, wherein the resources used by the speech recognition device are modified in accordance with the interactive modification of the symbolic representations;
    redisplaying the estimate as the phonetic representations are modified; and
    storing the speech recognition parameters in a memory of the speech recognition device.

12. The method of claim 11 wherein the speech recognition parameters comprise a first and second set of recognition parameters, wherein the first set configures a speech recognition system to respond to portions of words or phrases in the recognition set and produce a first set of intermediate results, and the second set configures the speech recognition system to analyze the intermediate results and produce a final result.

13. The method of claim 11 wherein the speech recognition device includes a likelihood estimator and the speech recognition parameters include an acoustic model accessed by the likelihood estimator.

14. The method of claim 13 wherein the acoustic model comprises neural network weights.

15. The method of claim 11 wherein the speech recognition device includes a grammar analyzer and the speech recognition parameters include a grammar specification data file accessed by the grammar analyzer.

16. The method of claim 15 wherein the grammar specification data file includes instructions for configuring a search algorithm on the speech recognition device to analyze acoustic information against all the words or phrases in the recognition set over a given time interval.

17. The method of claim 11 further comprising generating synthesized audio corresponding to the phonetic representations so that the user may interactively modify the phonetic representations and improve recognition accuracy.

18. A computer-readable storage medium including software for performing a method, the method comprising:
receiving a recognition set from a user, the recognition set comprising one or more text words or phrases to be recognized;
automatically generating a plurality of alternate phonetic representations of each word or phrase in the recognition set;
displaying the phonetic representations to the user in a graphical user interface;
generating a plurality of speech recognition parameters for the recognition set based on said phonetic representations;
calculating an estimate of the resources used by a speech recognition device to recognize the words or phrases in the recognition set using the speech recognition parameters;
displaying the estimate to the user in the graphical user interface;
interactively modifying the phonetic representations, and in accordance therewith, modifying the speech recognition parameters, wherein the resources used by the speech recognition device are modified in accordance with the interactive modification of the symbolic representations; and
redisplaying the estimate as the phonetic representations are modified.

19. The method of claim 18 wherein the phonetic representations are displayed on a keyboard.

20. The method of claim 18 further comprising generating synthesized audio corresponding to the phonetic representations.

21. The method of claim 18 further comprising generating a plurality of alternate phonetic representations for a first word or phrase in the recognition set and corresponding speech recognition parameters for recognizing each of the plurality of alternate phonetic representations of the first word or phrase.

22. The method of claim 18 wherein the speech recognition parameters include an acoustic model.

23. The method of claim 18 wherein the speech recognition parameters include an acoustic model comprising instructions for programming a recognizer to respond to words or phrases in the recognition set at particular instances of time.

24. The method of claim 18 wherein the speech recognition parameters include a grammar specification data file comprising instructions for programming a recognizer to analyze acoustic information against all the words or phrases in the recognition set over a given time interval.

25. The method of claim 18 wherein the speech recognition parameters include instructions for determining when the end of speech is detected by the recognizer.

26. The method of claim 18 wherein the speech recognition parameters include matching criteria for matching an input speech signal to the words or phrases in the recognition set.

27. The method of claim 18 wherein the speech recognition parameters include matching sensitivity for modifying the recognition parameters to allow for an easier or more difficult match of surrounding out-of-vocabulary words.

28. The method of claim 18 wherein the speech recognition parameters include out of vocabulary sensitivity for modifying sensitivity of an out-of-vocabulary determination.

29. The method of claim 18 further comprising batch testing recognition on a local computer based on the speech recognition parameters.

30. The method of claim 18 further comprising configuring a speech recognition system with the speech recognition parameters.

31. The method of claim 30 further comprising storing the recognition parameters in a memory coupled to the speech recognition system.

* * * * *